(12) United States Patent
Rikitake et al.

(10) Patent No.: US 9,077,559 B2
(45) Date of Patent: Jul. 7, 2015

(54) SWITCHING APPARATUS AND METHOD FOR SETTING UP VIRTUAL LAN

(75) Inventors: Nobuhiro Rikitake, Kawasaki (JP); Kazuhiro Ohnuma, Kawasaki (JP); Mitsumasa Matsuike, Kawasaki (JP); Motoshi Hamasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/047,307

(22) Filed: Mar. 14, 2011

(65) Prior Publication Data

US 2011/0299424 A1 Dec. 8, 2011

(30) Foreign Application Priority Data

Jun. 3, 2010 (JP) .................................. 2010-127865

(51) Int. Cl.
*H04L 12/935* (2013.01)
*H04L 12/46* (2006.01)
*H04L 12/931* (2013.01)

(52) U.S. Cl.
CPC ......... *H04L 12/4625* (2013.01); *H04L 12/4641* (2013.01); *H04L 49/3009* (2013.01); *H04L 49/354* (2013.01)

(58) Field of Classification Search
None
See application file for complete search history.

(56) References Cited

U.S. PATENT DOCUMENTS

| | | | |
|---|---|---|---|
| 5,923,654 A * | 7/1999 | Schnell .......................... | 370/390 |
| 6,085,238 A | 7/2000 | Yuasa et al. | |
| 6,430,621 B1 * | 8/2002 | Srikanth et al. ............... | 709/238 |
| 6,999,452 B1 * | 2/2006 | Drummond-Murray et al. .............................. | 370/389 |
| 2002/0067296 A1 * | 6/2002 | Brown .......................... | 341/106 |
| 2002/0101868 A1 * | 8/2002 | Clear et al. ..................... | 370/389 |
| 2003/0035432 A1 * | 2/2003 | Sreejith et al. ................. | 370/415 |
| 2003/0152075 A1 | 8/2003 | Hawthorne, III et al. | |
| 2004/0076163 A1 | 4/2004 | Ikeda | |
| 2006/0002311 A1 | 1/2006 | Iwanaga et al. | |
| 2006/0007917 A1 | 1/2006 | Saito et al. | |
| 2007/0047546 A1 * | 3/2007 | Deguchi et al. ............... | 370/390 |
| 2007/0258446 A1 | 11/2007 | Smith et al. | |

(Continued)

FOREIGN PATENT DOCUMENTS

| | | |
|---|---|---|
| CN | 1848767 A | 10/2006 |
| CN | 101080903 A | 11/2007 |
| CN | 101083622 A | 12/2007 |

(Continued)

OTHER PUBLICATIONS

European Search Report dated Jul. 1, 2011 in corresponding European Patent Application 11158435.5.

(Continued)

*Primary Examiner* — Ian N Moore
*Assistant Examiner* — Latresa McCallum
(74) *Attorney, Agent, or Firm* — Staas & Halsey LLP

(57) ABSTRACT

A switching apparatus having a plurality of ports, includes: switch information storage to store an output port identifier for a combination of an input port identifier, an input virtual path identifier, and a destination address; a detector to detect a first input virtual path identifier and a first destination address assigned to an input packet; a searcher to search the switch information storage for a first output port identifier based on a first input port identifier that identifies a port to which the input packet has been input, the first input virtual path identifier, and the first destination address; and a packet switch to transfer the input packet to a port identified by the first output port identifier.

5 Claims, 20 Drawing Sheets

(56) References Cited

U.S. PATENT DOCUMENTS

2007/0280258 A1* 12/2007 Rajagopalan et al. ..... 370/395.3
2010/0054251 A1* 3/2010 Lee et al. ..................... 370/392

FOREIGN PATENT DOCUMENTS

| EP | 1 863 234 A1 | 12/2007 |
|----|--------------|---------|
| JP | 10-224391 | 8/1998 |
| JP | 2002-247089 | 8/2002 |
| JP | 2004-140780 | 5/2004 |
| JP | 2006-25121 | 1/2006 |
| JP | 2008-227695 | 9/2008 |
| WO | 99/00935 | 1/1999 |
| WO | 01/71985 A1 | 9/2001 |

OTHER PUBLICATIONS

Extended European Search Report dated Oct. 17, 2011 in corresponding European Patent Application No. 11158435.5.
Office Action issued Jun. 20, 2013 in corresponding Chinese Application No. 201110077393.2.
Office Action mailed Feb. 12, 2014 in corresponding Japanese Application No. 2010-127865.

* cited by examiner

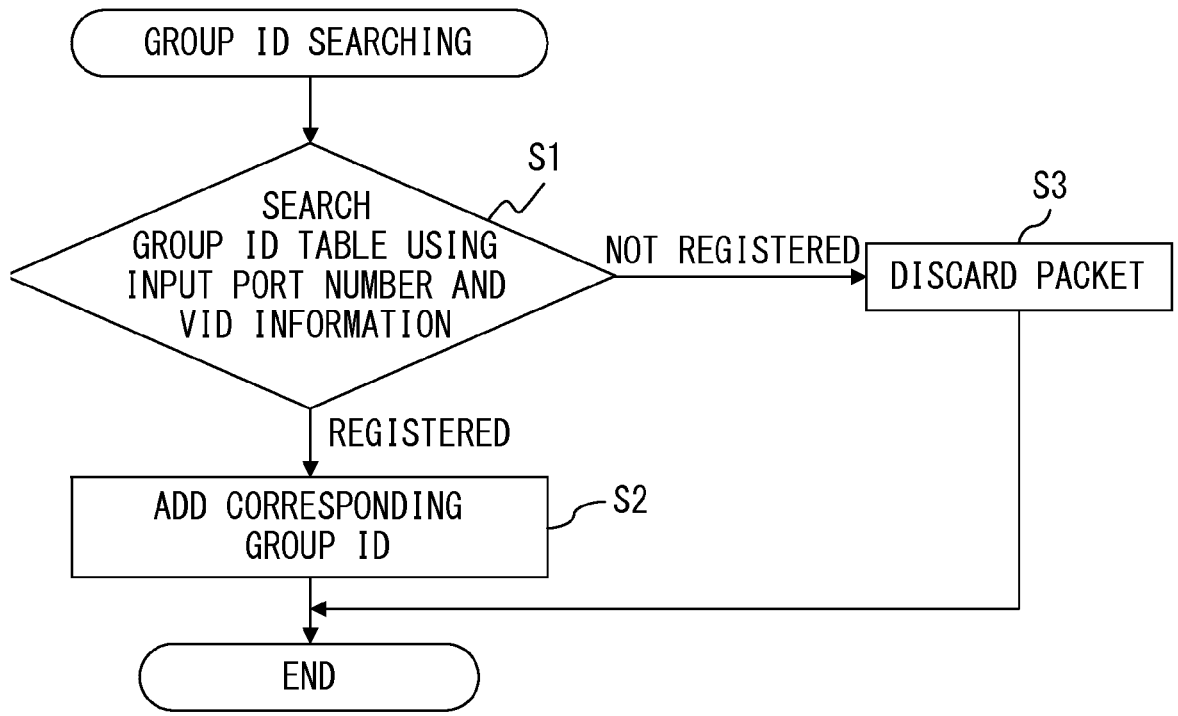
F I G. 7

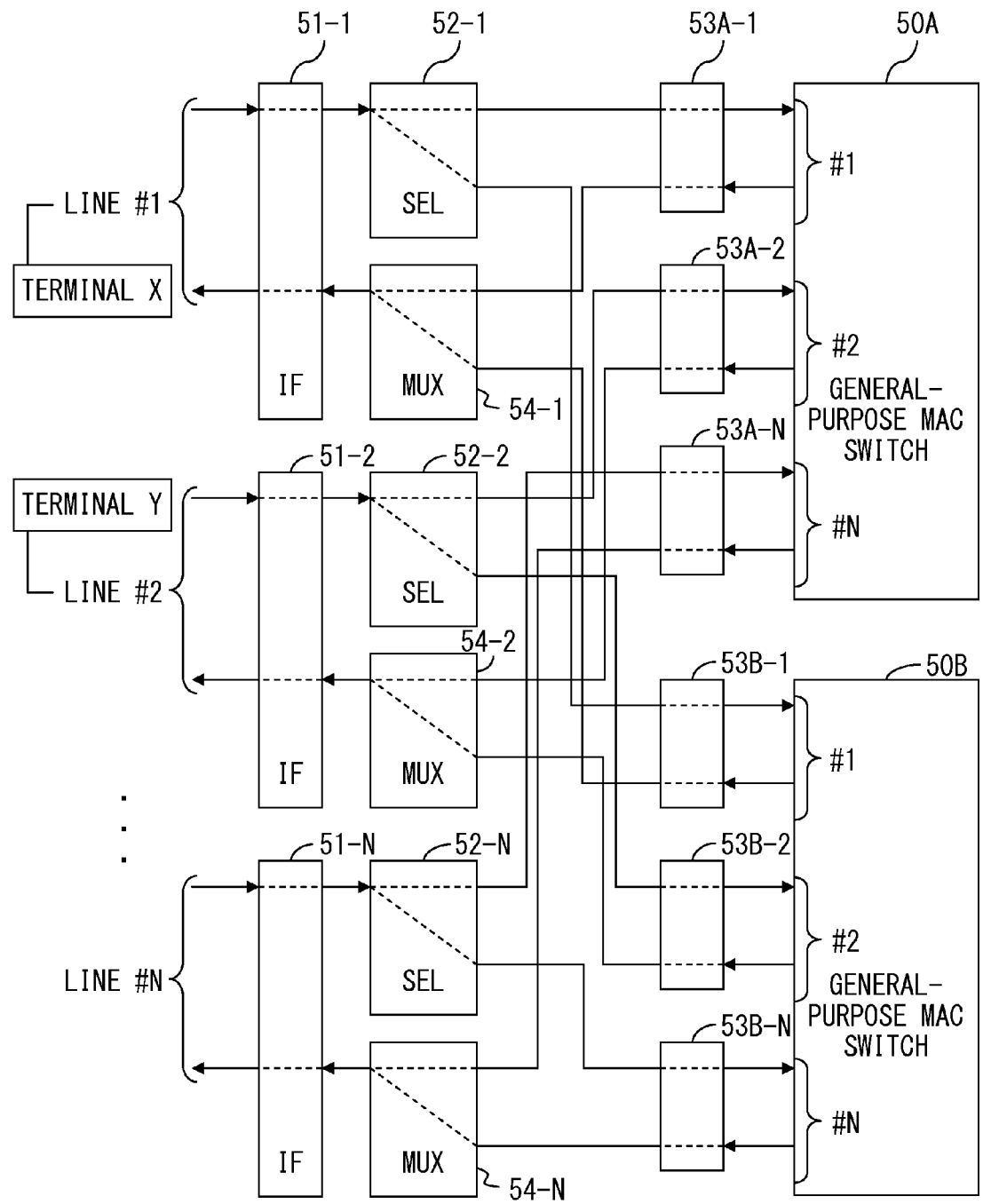
F I G. 1 0

FIG. 11

| REGISTRATION NUMBER | SWITCH NUMBER | INTERNAL VID | VID@#1 | VID@#2 | ... | VID@#N |
|---|---|---|---|---|---|---|
| 1 | 50A | 1 | 100 | 200 | | — |
| 2 | | 2 | — | 100 | | 150 |
| 3 | | 3 | | | | |
| ...... | | ...... | | | | |
| 4094 | | 4094 | | | | |
| 4095 | 50B | 4095 | | | | |
| 4096 | | 4096 | | | | |
| 4097 | | 4097 | | | | |
| ...... | | ...... | | | | |
| 8188 | | 8188 | | | | |

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+ Label
|                Label                  | Exp |S|       TTL     | Stack
+-+-+-+-+-+-+-+-+-+-+-+-+-+-+-+-+-+-+-+-+-+-+-+-+-+-+-+-+-+-+-+-+ Entry
```

Label:  Label Value, 20 bits
Exp:    Experimental Use, 3 bits
S:      Bottom of Stack, 1 bit
TTL:    Time to Live, 8 bits

F I G. 1 4

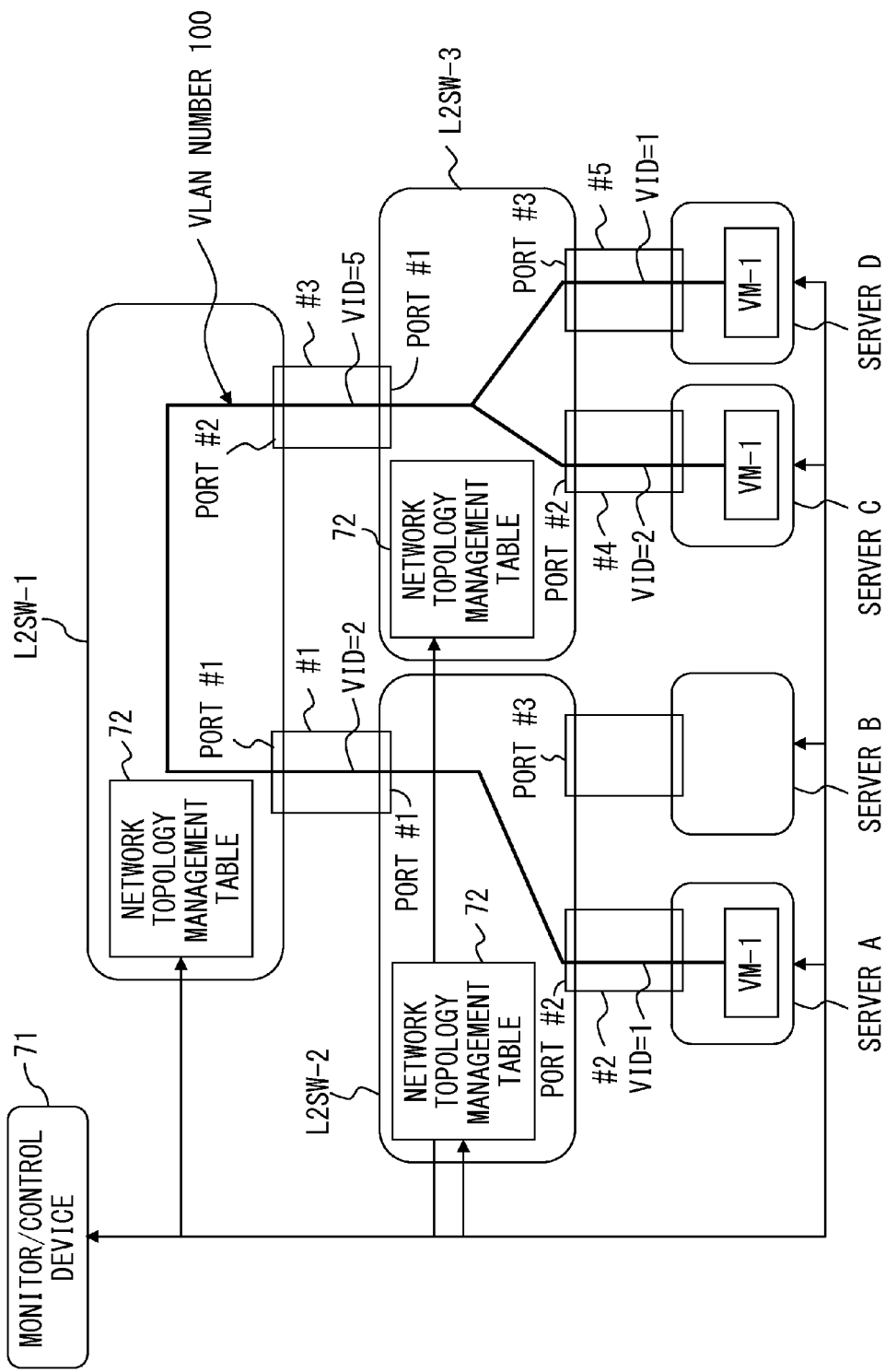
F I G. 16

| HIGHER-LEVEL SIDE SWITCHING APPARATUS | | | LOWER-LEVEL SIDE SWITCHING APPARATUS | | | SERVER |
|---|---|---|---|---|---|---|
| PORT NUMBER FOR UPLINK | APPARATUS ID | PORT NUMBER FOR DOWNLINK | PORT NUMBER FOR UPLINK | APPARATUS ID | PORT NUMBER FOR DOWNLINK | SERVER ID |
| - | 1 | 1 | 1 | 2 | 2 | A |
| | | | | | 3 | B |
| | | 2 | 1 | 3 | 2 | C |
| | | | | | 3 | D |

F I G. 17

| REGISTRATION NUMBER | VLAN NUMBER | CONNECTION SECTION (CONNECTION GROUP) |
|---|---|---|
| 1 | 100 | SERVER A_VM1, SERVER C_VM1, SERVER D_VM1 |
| 2 | 200 | SERVER A_VM2, SERVER B_VM2 |
| n | xxx | SERVER x, SERVER y, SERVER z, ･･･ |

F I G. 1 9

SWITCHING APPARATUS AND METHOD FOR SETTING UP VIRTUAL LAN

CROSS-REFERENCE TO RELATED APPLICATION

This application is based upon and claims the benefit of priority of the prior Japanese Patent Application No. 2010-127865, filed on Jun. 3, 2010, the entire contents of which are incorporated herein by reference.

FIELD

The present invention is related to a switching apparatus that provides a plurality of virtual paths, and to a method for setting up a virtual LAN.

BACKGROUND

In recent years, attention has been paid to PaaS (Platform as a Service), which makes plural virtual machines operate on a server computer in order to provide a user with platform using the virtual machine.

PaaS is implemented by, for example, setting a plurality (from several to tens of thousands) of servers in a data center to provide external server resources through a network. In this configuration, server resources are provided as virtual servers, and users use virtual servers in a data center through the Internet, intranets, dedicated lines, or the like. According to this configuration, a physical server is shared by plural users, and thus physical resources (e.g., processors and storage) are used efficiently.

As described above, according to PaaS, a physical server is shared by plural users. Accordingly, PaaS environments need to have functions to enhance security.

As a method for ensuring security in networks, virtual local area network (referred to as "virtual LAN" or "VLAN", hereinafter) technology has been put into practical use. A virtual LAN is realized by, for example, virtually dividing physical lines in order to set a plurality of virtual paths that are independent from other paths, and assigning respective virtual paths to corresponding users. Thereby, each data communication between users is isolated from other data communications so that security is ensured.

As methods for dividing lines, a method in which lines are divided on the IP packet layer (L3), a method in which lines are divided on the MAC layer (L2), and other methods are proposed. Today, a method in which virtual LAN techniques for the L2 layer, standardized by IEEE802.1Q, are used is employed the most widely.

According to IEEE802.1Q, each virtual LAN is identified by a VLAN-ID of 12 bits. Using 12-bit VLAN-IDs, 4096 virtual LANs can be identified. However, in general, a VLAN-ID having "0" in all the bits or having "1" in all the bits is not used. Thus, according to this scheme, a maximum of 4094 virtual LANs may be set up.

However, according to PaaS, a plurality of virtual machines are set on each physical server as described above. Further, one or more virtual LANs are assigned to each virtual machine. Consequently, in PaaS environments or the like in a large-scale data center provided with a plurality of physical servers, the substantive number of machines (i.e., the total number of virtual machines) is enormous, and more than 4094 virtual LANs are expected to be needed.

This problem is solved by a configuration of, for example, connecting a plurality of L2 networks via IP routers, or the like. In such a case, 4094 virtual LANs can be set up on each L2 network.

However, this configuration requires the addition of IP routers and also the preparation of ports to connect such IP routers to. In other words, there is a possibility of an increase in the cost of the devices used to set up a network. Also, there is a possibility that a bottleneck in communication performance (i.e., the reduction of throughput) will occur in IP routers (or the L3 network) if the IP routers do not have sufficient capabilities. Further, network administrators have to understand IP routing that is more complex than that of the L2 protocol, leading to a possibility of an increase in operation costs.

Note that the above-described problems are not caused only in PaaS environments. In other words, such problems may be caused in environments that need many virtual LANs.

As a related art, a packet routing method as below is proposed. According to that method, in a virtual hub, the relationship between the transmission source MAC address in the user MAC header of a received packet and the virtual interface on the side of a terminal that this packet has passed through is learned, and the learned information is stored. The packet is transferred according to the stored information. To the network side, the packet to which a VPN number has been added is transmitted after being encapsulated into an IP packet (Japanese Laid-open Patent Publication No. 2002-247089, for example).

As another related art, a configuration in which a micro segment that is common to a plurality of switching hubs can be set for respective ports is proposed. The switching hub has a plurality of ports, and a device such as a terminal or the like is connected to each of the ports. A segment management unit has a segment management table. The segment management table stores information representing which of plural micro segments each port belongs to, and the table is managed by the segment management unit. Packets are transmitted and received for respective micro segments without referring to the network addresses of devices connected to the ports. In other words, arbitrary combinations of micro segments common to a plurality of switching hubs can be set and shared for respective ports (Japanese Laid-open Patent Publication No. 10-224391, for example).

As yet another related art, a path control method used for a network including an optical path of optical division multiplexing is proposed. This method includes a VLAN identifier derivation step of deriving a VLAN identifier from a received packet, a wavelength identifier derivation step of deriving a wavelength identifier related to the wavelength of the carrier wave for the received packet, and a transfer route determination step of using at least both the VLAN identifier and the wavelength identifier (Japanese Laid-open Patent Publication No. 2004-140780, for example).

As yet another related art, a packet communications method as below is proposed. According to that method, a VLAN tag is substituted with a duplicated VLAN tag (shared tag) by using a tag table at a first duplicated VLAN tag assignment device located on a path for a packet transferred from a first duplicated VLAN tag assignment device to a first backbone node. Thereafter, the duplicated VLAN tag is changed back to the original VLAN tag by using a tag table at a duplicated VLAN tag assignment device that the packet passes through before it reaches the device in the user's house in the target network (Japanese Laid-open Patent Publication No. 2008-227695, for example).

As has been described above, the number of virtual LANs that can be set up on a network is limited by standards or the like. Or, setting up a lot of virtual LANs increases the cost because of the addition of network devices, etc.

SUMMARY

According to an aspect of an invention, a switching apparatus having a plurality of ports includes: switch information storage to store an output port identifier for a combination of an input port identifier, an input virtual path identifier, and a destination address; a detector to detect a first input virtual path identifier and a first destination address assigned to an input packet; a searcher to search the switch information storage for a first output port identifier based on a first input port identifier that identifies a port to which the input packet has been input, the first input virtual path identifier, and the first destination address; and a packet switch to transfer the input packet to a port identified by the first output port identifier.

According to another aspect of an invention, a method for setting up a virtual LAN includes: generating topology information representing a network topology; generating virtual LAN information that identifies a terminal that belongs to the virtual LAN; determining lines used for setting up the virtual LAN based on the topology information and the virtual LAN information; assigning a first virtual path identifier and a second virtual path identifier to a first line and a second line among the determined lines, respectively, in a switching apparatus to which the first line and the second line are connected; and generating switch information including a second port identifier that identifies a port to which the second line is connected and the second virtual path identifier for a combination of a first port identifier that identifies a port to which the first line is connected, the first virtual path identifier, and a destination address.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates a flowchart of a group ID searching process;

FIG. 10 illustrates an example of a configuration of increasing the number of virtual LANs by using general-purpose MAC switches;

FIG. 11 illustrates an example of a virtual LAN management table used in the configuration illustrated in FIG. 10;

FIG. 14 illustrates an MPLS header;

FIG. 16 illustrates an example of a configuration of a network including a plurality of switching apparatuses;

FIG. 17 illustrates an example of a network topology management table;

FIG. 19 illustrates an example of a virtual LAN management table.

DESCRIPTION OF EMBODIMENTS

Figure 1:
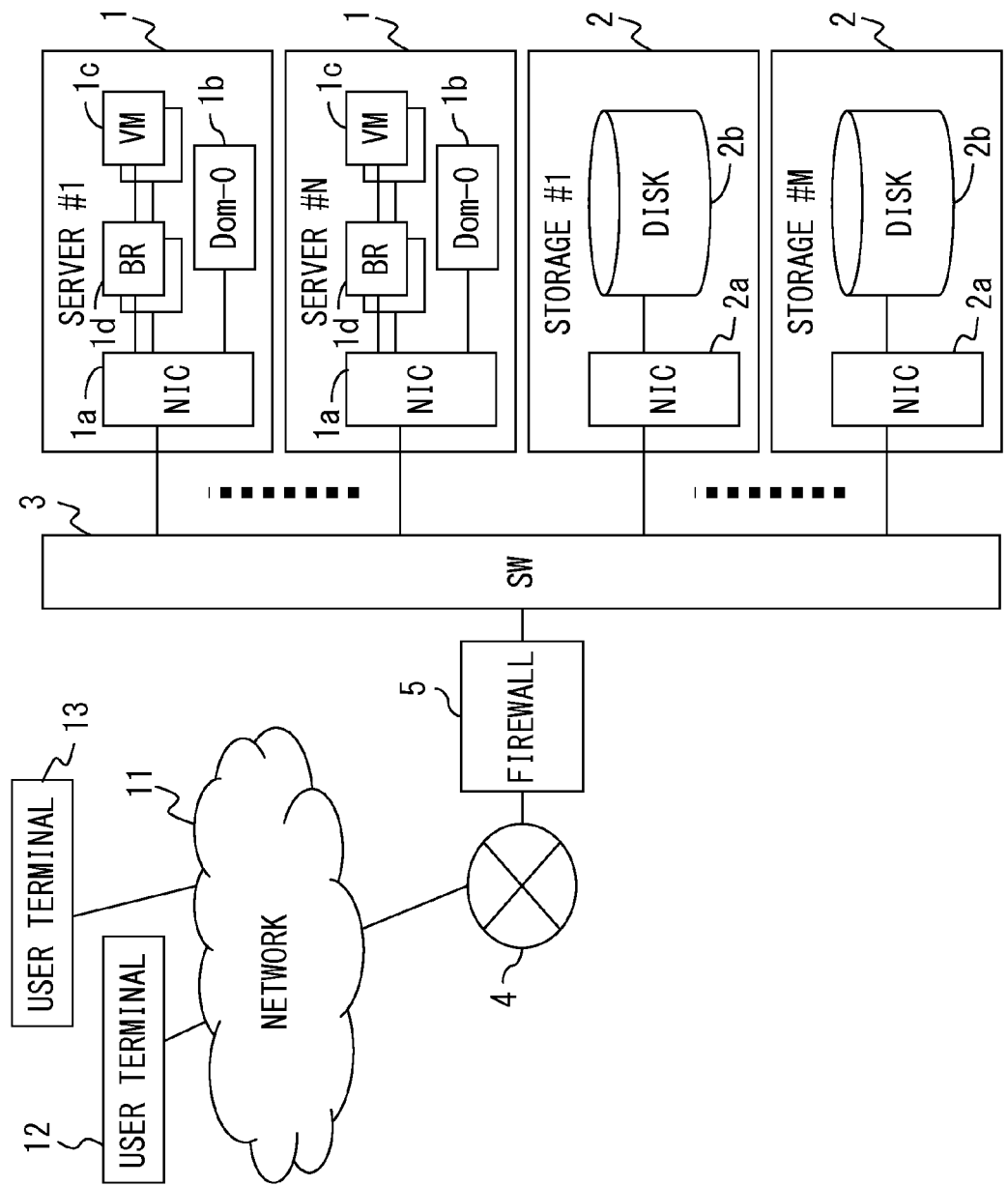
FIG. 1 illustrates a configuration of a data center system in which a switching apparatus according to an embodiment is used.

FIG. 1 illustrates a configuration of a data center system in which a switching apparatus according to an embodiment is used. The data center system includes a plurality of server systems 1 (#1 through #N), a plurality of storage systems 2 (#1 through #M), a switching apparatus 3, a router 4, and a firewall 5.

Each of the server systems 1 corresponds to, for example, a physical server. Each of the server systems 1 includes an NIC (Network Interface Card) 1a, a Dom-0 1b, a virtual machine (VM) 1c, and a virtual bridge (BR) 1d. The NIC 1a is implemented on the server system 1, and provides an interface for transmitting and receiving signals to/from the switching apparatus 3. The respective server systems 1 and the switching apparatus 3 are connected through fiber optic cables or metal cables. A metal cable is, for example, a UTP cable.

The Dom-0 1b is software (management OS) that entirely controls virtual servers set in the physical server. In other words, each virtual server is managed by the Dom-0 1b. The expression "Dom-0" means domain zero.

The virtual machine 1c is realized by virtualizing the hardware (the CPU, memory, or the like of the physical server), and providing an environment in which an OS operates on virtual hardware. In the server system 1, the virtual machine 1c corresponds to the OS developed on the Dom-0 1b. A plurality of virtual machines 1c may be implemented in each server system 1.

The virtual bridge 1d is provided to each virtual machine 1c. The virtual bridge 1d performs a virtual frame process and a packet transfer process between the NIC 1a and the virtual machine 1c.

Each of the storage systems 2 is provided with an NIC 2a and a disk device 2b. Each NIC 2a is implemented on the storage system 2, and provides an interface for transmitting and receiving signals to/from the switching apparatus 3. The respective storage systems 2 and the switching apparatus 3 are connected through fiber optic cables or metal cables similarly to the connections between the server systems 1 and the switching apparatus 3.

Each disk device 2b includes one or a plurality of recording disks, and stores information. Information is recorded on the recoding disk by, for example, an optical or magnetic effect and such information is read from the recording disk by an optical or magnetic effect although ways of recording and reading information are not limited to the above.

The switching apparatus 3 is connected to the server systems 1 (#1 through #N), the storage systems 2 (#1 through #M), and the router 4. In the example illustrated in FIG. 1, the firewall 5 is provided between the switching apparatus 3 and the router 4. The firewall 5 blocks unauthorized access to the server systems 1 (#1 through #N) and to the storage systems 2 (#1 through #M). Note that the data center system does not always need to be provided with the firewall 5.

Also, the switching apparatus 3 performs switching process on, for example, Layer 2 (referred to as "L2", hereinafter) of the OSI reference model. In this example, the switching apparatus 3 performs switching of MAC frames of the Ethernet (registered trademark). In the explanations below, a frame or a data unit processed by the switching apparatus 3 is referred to as a "packet".

The router 4 accommodates the server systems 1 (#1 through #N) and the storage systems 2 (#1 through #M), and is connected to a network 11. The network 11 is, for example, the Internet or an intranet, but is not limited to them. In addition, the data center system may be provided with a gateway in place of the router 4. Also, user terminals 12 and 13 are connected to the network 11. The user terminals 12 and 13 are, for example, personal computers.

The user terminals 12 and 13 are connected to the virtual machines 1c, respectively, when they receive services from the data center system. In other words, when the data center system provides the user terminals with services, it generates corresponding virtual machines 1c, respectively, and assigns the generated virtual machines 1c to the user terminals 12 and 13. Then, the user terminals 12 and 13 perform communications with the corresponding virtual machines 1c via different virtual LANs. In this configuration, virtual LANs are provided by the switching apparatus 3. In addition, communications between one virtual machine 1c and another virtual machine 1c, and communications between the virtual machines 1c and storage systems 2, are also performed via the switching apparatus 3.

Figure 2:
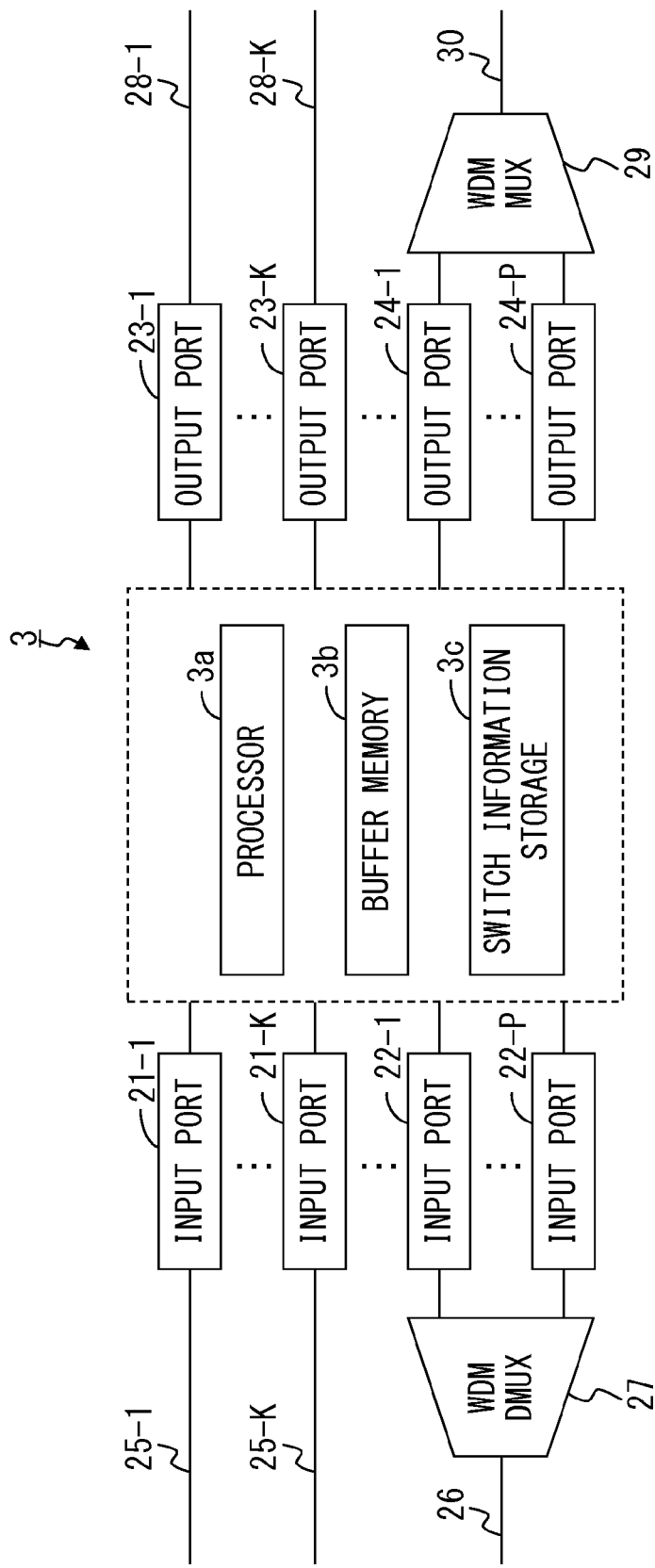
FIG. 2 illustrates a configuration of a switching apparatus.

FIG. 2 illustrates a configuration of the switching apparatus 3. The switching apparatus 3 includes a processor 3a, buffer memory 3b, and switch information storage 3c. The switching information storage 3c is realized by a memory implemented in the switching apparatus 3. Also, the switching apparatus 3 is provided with a plurality of input ports 21-1 through 21-K and 22-1 through 22-P, and a plurality of output ports 23-1 through 23-K and 24-1 through 24-P.

Lines 25-1 through 25-K are connected to the input ports 21-1 through 21-K, respectively. A line 26 transmits a wavelength multiplexed optical signal. A WDM demultiplexer 27 demultiplexes the wavelength multiplexed optical signal transmitted through the line 26 with respect to wavelength, and guides resultant signals to the input ports 22-1 through 22-P.

Lines 28-1 through 28-K are connected to the output ports 23-1 through 23-K, respectively. A wavelength division multiplexer 29 multiplexes optical signals output from the output ports 24-1 through 24-P. The output ports 24-1 through 24-P output optical signals having different wavelengths. Then, a wavelength multiplexed optical signal generated by the wavelength division multiplexer 29 is output to a line 30.

Packets input through the input ports 21-1 through 21-K and 22-1 through 22-P are stored in the buffer memory 3b temporarily. Then, the processor 3a refers to the switch information storage 3c, and determines an output port for each input of the packets. The processor 3a determines (or selects) an output port according to the input port identifier to identify the input port that received the packet, the virtual LAN identifier assigned to the input packet, and the destination address of the input packet. The switch information storage 3c stores output port identifiers for combinations of input port identifiers, input virtual path identifiers, and destination addresses. The packet stored in the buffer memory 3b is output through the output port determined by the processor 3a. At this time, the processor 3a may rewrite the virtual LAN identifier assigned to an input packet.

In addition, when the lines connected to the switching apparatus 3 transmit signals bi-directionally, the input ports also operate as output ports, and the output ports also operate as input ports. For example, when the line 25-1 transmits signals bi-directionally, the input port 21-1 operates as an input/output port.

The configuration illustrated in FIG. 2 is an example, and the lines connected to the switching apparatus 3 do not need to include WDM lines. Further, a radio link may be connected to the switching apparatus 3. In such a case, the radio link is also connected to an input port, an output port, or an input/output port.

As described above, the switching apparatus 3 according to an embodiment has a port for each communication path. Each physical line (fiber optic line or metal line) may correspond to a communication path. For example, the lines 25-1 through 25-N respectively correspond to communication paths, and the input ports 21-1 through 21-N are provided for the lines 25-1 through 25-N. It is also possible to provide a port for each path when a plurality of paths are multiplexed on a physical line. For example, a plurality of wavelength paths are set on the line 26, and the input ports 22-1 through 22-P are provided for the plural wavelength paths. Alternatively, when a plurality of radio links using different frequencies are set, it is also possible to provide a port for each frequency path.

Figure 3:
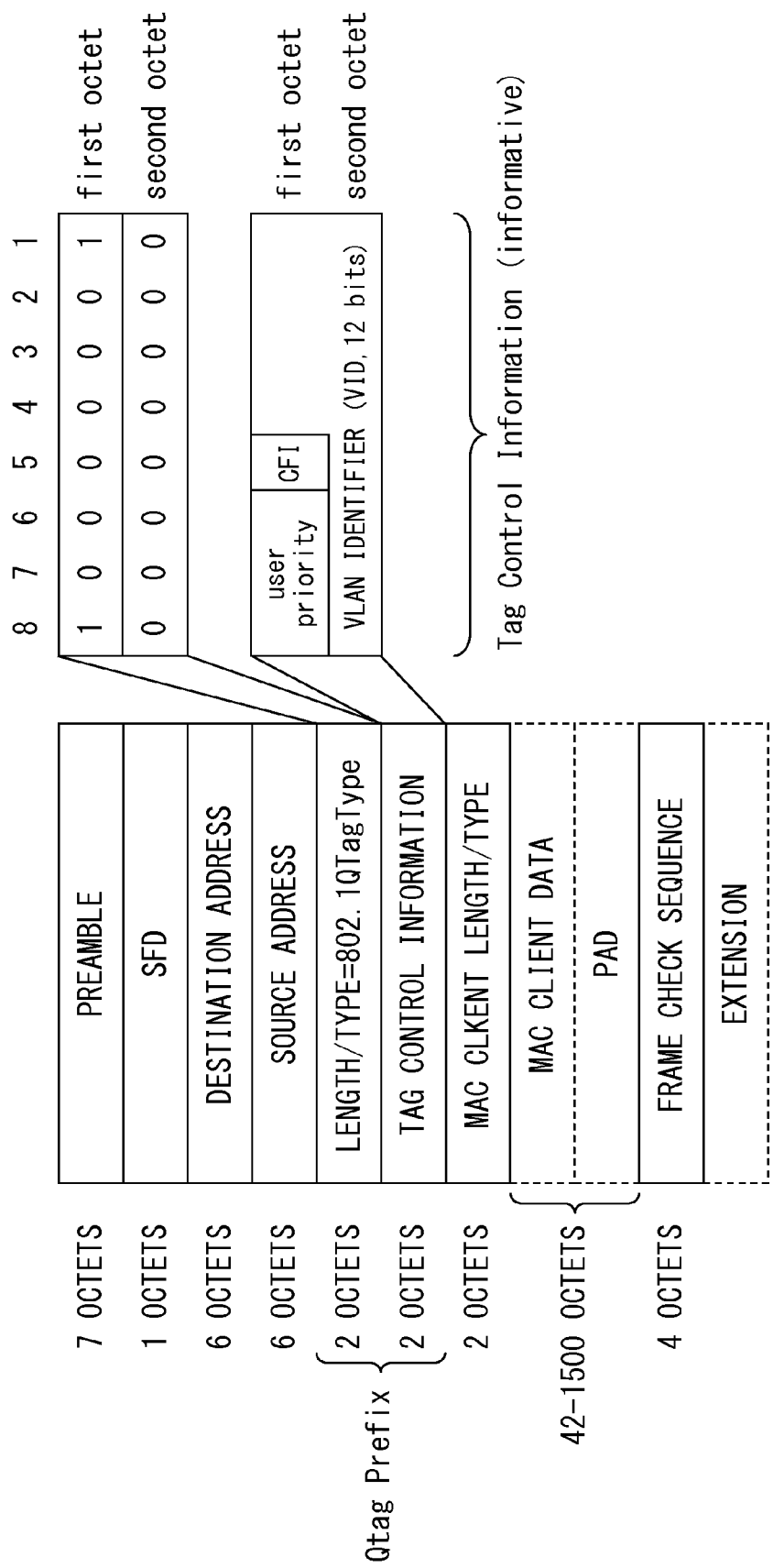
FIG. 3 illustrates a format of a packet used in the embodiment.

FIG. 3 illustrates a format of a packet used in the embodiment. In this example, a packet transferred by the switching apparatus 3 is an Ethernet frame including a VLAN-ID defined by IEEE802.1Q.

The header of this frame includes a preamble, an SFD, a destination address, a source address, an 802.1Q tag type, tag control information, and a MAC client length/type. The destination address and the source address are MAC addresses. Using a specified 12 bits in the tag control information, a virtual LAN identifier (VLAN identifier or VID) is expressed. Also, data is stored, following this header.

A virtual LAN identifier VID is used to identify a virtual LAN or a virtual path. However, in the switching apparatus according to the embodiment, a virtual LAN identifier VID is used as part of the information to identify a virtual LAN or a virtual path. In other words, a virtual LAN or a virtual path is identified by, for example, a combination of a virtual LAN identifier VID and an input port identifier.

Figure 4:
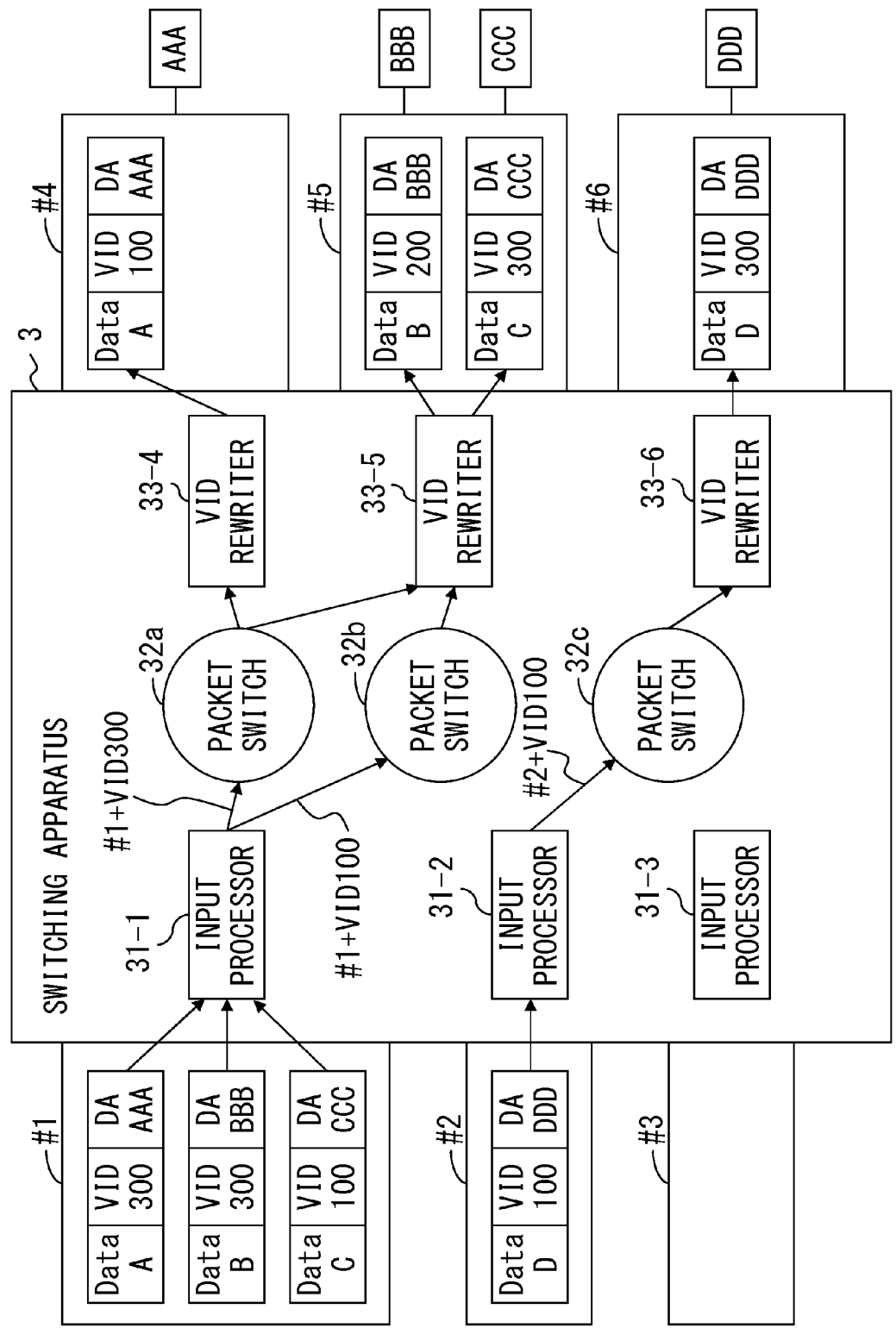
FIG. 4 illustrates operations of a switching apparatus.

FIG. 4 illustrates operations of the switching apparatus 3 according to the embodiment. In this example, the switching apparatus 3 has ports #1 through #6. In the explanation below, ports #1 through #3 are used as input ports, and ports #4 through #6 are used as output ports. Ports #1 through #3 receive packets transmitted through communication paths #1 through #3 (not illustrated), respectively. Also, packets output through ports #4 through #6 are directed to communication paths #4 through #6 (not illustrated), respectively.

The switching apparatus 3 is provided with an input processor for each of the input ports. In the example illustrated in FIG. 4, input processors 31-1 through 31-3 are provided for ports #1 through #3, respectively. The input processors 31-1 through 31-3 respectively transfer input packets to packet switches 32a through 32c corresponding to the virtual LAN identifiers.

The switching apparatus 3 has a packet switch for each virtual LAN. In FIG. 4, three packet switches 32a through 32c are illustrated. The packet switches 32a through 32c respectively transfer input packets to output ports (ports #4 through #6 in this example) corresponding to the destination addresses.

The switching apparatus 3 is provided with a VID rewriter for each of the output ports. In the example illustrated in FIG. 4, VID rewriters 33-4 through 33-6 are provided for ports #4 through #6, respectively. The VID rewriters 33-4 through 33-6 respectively rewrite the virtual LAN identifiers in packets to be output.

In the following explanation, it is assumed that packets A, B, and C are input through port #1 and packet D is input through port #2.

Destination addresses DA of packets A, B, and C are AAA, BBB, and CCC, respectively. The virtual LAN identifiers VID assigned to packets A, B, and C are 300, 300, and 100, respectively. In other words, packets A and B are transmitted through the same virtual LAN. Also, destination terminals AAA and BBB are connected to the same virtual LAN.

The input processor 31-1 transfers packets A, B, and C to the packet switches corresponding to the virtual LAN identifiers VID. In this example, the input processor 31-1 transfers to the packet switch 32a packets A and B to which "VID 300" has been assigned. Also, the input processor 31-1 transfers to the packet switch 32b packet C to which "VID 100" has been assigned.

Each of the packet switches 32a through 32c transfers a packet to the output port corresponding to the destination address. In this example, the packet switch 32a transfers packet A to port #4 in accordance with destination address AAA, and transfers packet B to port #5 in accordance with destination address BBB. Also, the packet switch 32b transfers packet C to port #5 in accordance with destination address CCC.

The VID rewriter 33-4 rewrites the virtual LAN identifier VID of a packet to be output through port #4. In this example, the virtual LAN identifier VID of packet A is rewritten from 300 to 100. Also, the VID rewriter 33-5 rewrites the virtual LAN identifier VID of a packet to be output through port #5. In this example, the virtual LAN identifier VID of packet B is rewritten from 300 to 200, and the virtual LAN identifier VID of packet C is rewritten from 100 to 300.

As described above, input packets are transferred to the corresponding packet switches 32a through 32c in accordance with the virtual LAN identifiers VID. Each of the packet switches 32a through 32c transfers input packets to the output ports corresponding to the destination addresses DA. In other words, the switching apparatus 3 performs switching on packets for each virtual LAN. Thereby, virtual LANs are set up, and security is ensured in each communication.

However, in the switching apparatus 3 according to the embodiment, a virtual LAN is identified by a virtual LAN identifier VID for each input port. In other words, a virtual LAN is identified based on the combination of the input port identifier specifying the port that has received the input packet and the virtual LAN identifier VID.

For example, "VID 100" is assigned to packet C that is input through port #1. "VID 100" is also assigned to packet D that is input through port #2. In other words, the same virtual LAN identifier VID is assigned to packets C and D. However, the switching apparatus 3 transfers packets C and D through different virtual LANs. Specifically, packet C is transferred to the packet switch 32b as described above. The packet switch 32b provides switching operations of the virtual LAN identified by "INPUT PORT #1+VID 100". Meanwhile, the input processor 31-2 transfers packet D to the packet switch 32c. The packet switch 32c provides switching operations of the virtual LAN identified by "INPUT PORT #2+VID 100". As described above, packets C and D are processed by different packet switches.

The packet switch 32c transfers packet D to port #6 in accordance with destination address DDD. At this time, the VID rewriter 33-6 rewrites, from 100 to 300, the virtual LAN identifier VID of packet D to be output through port #6.

As described above, in the switching apparatus 3 according to the embodiment, a virtual LAN is identified based on a combination of an input port identifier and a virtual LAN identifier VID. In this example, an input port corresponds to a communication path (a physical line, a wavelength path, a frequency path, or the like) that transmits input packets. Accordingly, virtual LAN identifiers VID can be used independently for each communication path, and virtual LANs can be set up independently for each communication path. In other words, when a virtual LAN identifier VID is 12-bit data as illustrated in FIG. 3, up to 4094 virtual LANs can be set up for each communication path. Thus, a configuration according to the embodiment can increase the number of virtual LANs in proportion to the number of communication paths.

Figure 5:
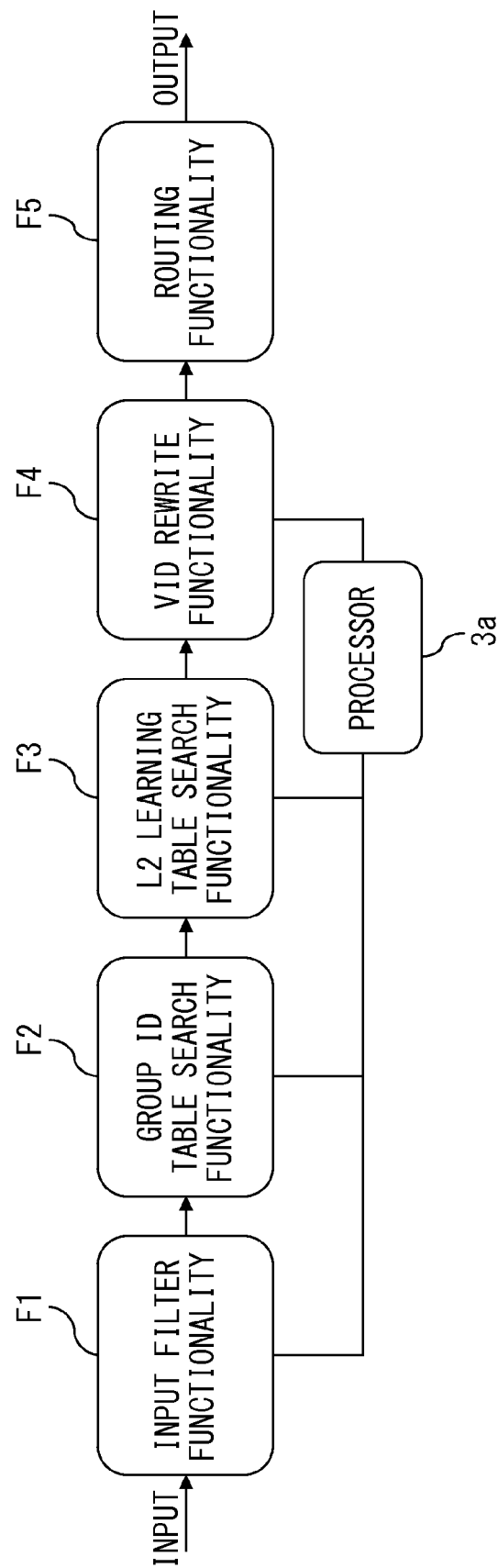
FIG. 5 illustrates a functional block diagram of a switching apparatus.

FIG. 5 illustrates a functional block diagram of the switching apparatus 3. The switching apparatus 3 has input filter functionality F1, group ID table search functionality F2, L2 learning table search functionality F3, VID rewrite functionality F4, and routing functionality F5 in order to transfer a packet input through arbitrary ports to an destination address of the packet.

Input filter functionality F1 performs a filtering process by referring to the header information of an input packet. The header information includes a preamble, an SFD, a destination address, a source address, an 802.1Q tag type, tag control information, and a MAC client length/type illustrated in FIG. 3. Input filter functionality F1 may discard an error packet or a packet that is not normal. Also, input filter functionality F1 detects an input port identifier that identifies the port that received the input packet, the virtual LAN identifier assigned to the input packet, and the destination address of the input packet. The input port identifier is detected, for example, by using an enable signal output from the port that received the input packet. The virtual LAN identifier and the destination address are extracted from the header of the input packet.

When an input packet is processed by input filter functionality F1, the packet is stored in the buffer memory 3b illustrated in FIG. 2. Alternatively, an input packet is stored in the buffer memory 3b illustrated in FIG. 2 after processed by input filter functionality F1. When the input packet is stored in the buffer memory 3b, input port identifier of the input packet is held in such a manner that they correspond to the input packet. In other words, the input port identifier is substantially assigned to the input packet.

Group ID table search functionality F2 searches for the input port identifier and the virtual LAN identifier of the input packet in the group ID table. The group ID table stores group IDs with respect to combinations of input port identifiers and input virtual LAN identifiers. The group ID table is created as part of the switch information storage 3c illustrated in FIG. 2. The group ID is used to identify virtual LANs in the switching apparatus 3. Also, the group ID is used to identify packet switches 32a through 32c in FIG. 4.

Group ID table search functionality F2 assigns to the input packet a group ID obtained from the above search. The process of assigning a group ID to an input packet is implemented by, for example, holding a group ID in the buffer memory 3b in such a manner that the group ID corresponds to the input packet. When the combination of the input port identifier and the virtual LAN identifier of the input packet is not registered on the group ID table, group ID table search functionality F2 discards the input packet.

L2 learning table search functionality F3 searches for the group ID and the destination address of the input packet in the L2 learning table. The L2 learning table stores output port identifiers with respect to combinations of group IDs and destination addresses. The L2 learning table is created as part of the switch information storage 3c illustrated in FIG. 2.

L2 learning table search functionality F3 assigns to the input packet an output port identifier obtained from the above search. The process of assigning an output port identifier to an input packet is implemented by, for example, holding an output port ID in the buffer memory 3b in such a manner that the output port ID corresponds to the input packet. When the combination of the group ID and the destination address of the input packet is not registered on the L2 learning table, L2 learning table search functionality F3 obtains multicast information corresponding to the group ID.

VID rewrite functionality F4 searches for the group ID and the output port identifier of the input packet in the VID conversion table. The VID conversion table stores output virtual LAN identifiers with respect to combinations of group IDs and output port identifiers. The VID conversion table is created as part of the switch information storage 3c illustrated in FIG. 2.

VID rewrite functionality F4 rewrites the virtual LAN identifier that has been assigned to the input packet (i.e., the input virtual LAN identifier) to the output virtual LAN identifier obtained from the above search. When the combination of the group ID and the output port identifier of the input packet is not registered on the VID conversion table, VID rewrite functionality F4 outputs an error signal.

The routing functionality F5 reads, from the buffer memory 3b, the packet whose virtual LAN identifier has been rewritten by VID rewrite functionality F4. Then, routing functionality F5 transfers this packet to the port specified by the output port identifier that L2 learning table search functionality F3 obtained from the search. Thereby, this packet is output through the specified port.

As described above, input filter functionality F1 operates as a detector to detect the input virtual path identifier and the destination address assigned to an input packet. Group ID table search functionality F2 and L2 learning table search functionality F3 operate as a searcher to search the switch information storage for the output port identifier according to the input port identifier that identifies the port through which an input packet was input, the input virtual path identifier, and the destination address.

Functionalities F1 through F5 are realized by the execution of a program by the processor 3a. Part of functionalities F1 through F5 may be realized by a hardware circuit.

Figure 6:
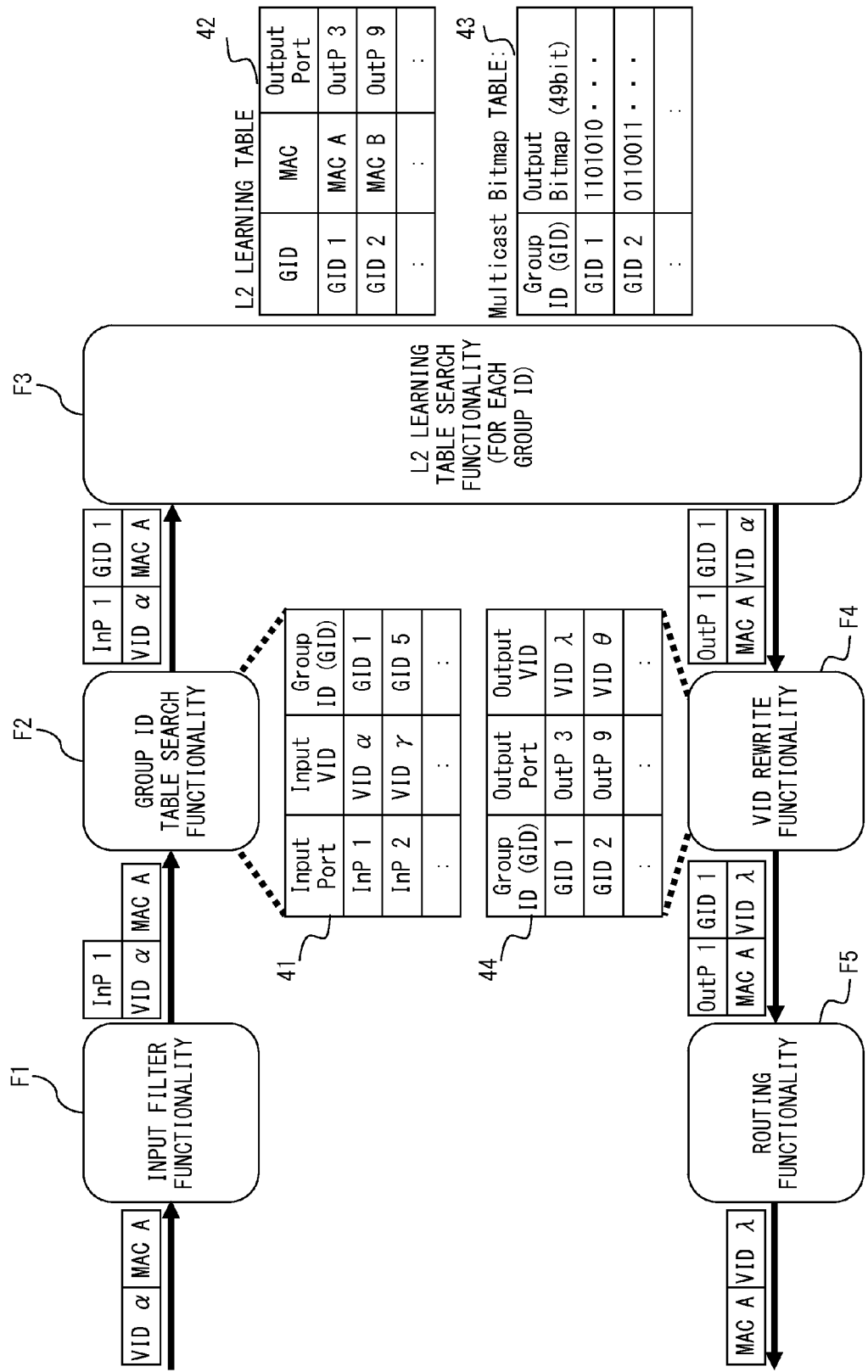
FIG. 6 illustrates an example of operations of a switching apparatus.

FIG. 6 illustrates an example of operations of the switching apparatus 3. In this example, a group ID table 41, an L2 learning table 42, a multicast bitmap table 43, and a VID conversion table 44 are created, for example, in advance. The maximum number of entries for each of the tables 41 through 44 is "Q×V". Q is a number of input ports or input/output ports of the switching apparatus 3. For example, when the switching apparatus 3 hasten input ports and ten output ports, this means "Q=10". Or, when the switching apparatus 3 has twenty input/output ports, this means "Q=20". Also, V is determined by the number of bits used by a virtual LAN identifier VID. For example, a virtual LAN identifier is of 12 bits, and this means "V=4094". Note that it is assumed that a VID having "1" in all bits and a VID having "0" in all bits are not used.

In the explanations below, it is assumed that a packet is input through port #1. It is also assumed that the virtual LAN identifier assigned to the input packet is "α", and that the destination address is "A".

Input filter functionality F1 performs filtering process on the input packet. It is assumed in this example that the input packet passes the filter without being discarded. Also, input filter functionality F1 detects the input port identifier specifying the port that received the input packet. It is assumed in this example that "#1" is detected as the input port identifier. Further, "α" and "A" are detected as the virtual LAN identifier and the destination address, respectively.

Group ID table search functionality F2 searches for "INPUT PORT=#1" AND "INPUT VID=α" in the group ID table 41.

In this example, "GROUP ID=1" is obtained from this search. The process of searching for a group ID corresponds to a process of determining a packet switch (32a through 32c) performed by an input processor (31-1 through 31-3) in FIG. 4.

L2 learning table search functionality F3 searches for "GROUP ID=1" and "DESTINATION ADDRESS=A" in the L2 learning table 42. In this example, "OUTPUT PORT=#3" is obtained from this search.

VID rewrite functionality F4 searches for "GROUP ID=1" and "OUTPUT PORT=#3" in the VID conversion table 44. In this example, "OUTPUT VID=λ" is obtained from this search. Thereafter, VID rewrite functionality F4 rewrites virtual LAN identifier α that has been assigned to the input packet into output virtual LAN identifier λ retrieved from the VID conversion table 44.

Routing functionality F5 outputs, through the port identified by the output port identifier, the packet whose virtual LAN identifier has been rewritten by VID rewrite functionality F4. In this example, a packet to which virtual LAN identifier λ has been assigned is output through port #3. When this packet is output, a group ID or an output port identifier is not assigned to the packet.

When the combination of the group ID and the destination address of the input packet is not registered on the L2 learning table 42, L2 learning table search functionality F3 extracts, from the multicast bitmap table 43, a multicast bitmap corresponding to the group ID. Each bit in the multicast bitmap corresponds to, for example, a port included in the switching apparatus 3. In such a case, the packet is output through respective ports to which "1" is assigned.

As described above, according to the switching apparatus 3 of the embodiment, a group ID is determined for the combination of an input port and a virtual LAN identifier VID, and a virtual LAN is identified by using that group ID. This makes it possible to use the same virtual LAN identifier on different communication paths. As a result, the switching apparatus 3 can provide a greater number of virtual LANs.

FIG. 7 illustrates a flowchart of a group ID searching process. The process based on this flowchart is executed, for example, by group ID table search functionality F2, which is realized by the processor 3a.

In step S1, group ID table search functionality F2 searches for the combination of the input port identifier and the virtual LAN identifier VID of an input packet in the group ID table 41. When the corresponding information is registered on the table, the corresponding group ID is extracted from the group ID table 41 in step S2. The extracted group ID is added to the input packet. When the above combination is not registered on the group ID table 41, the input packet is discarded in step S3.

Figure 8:
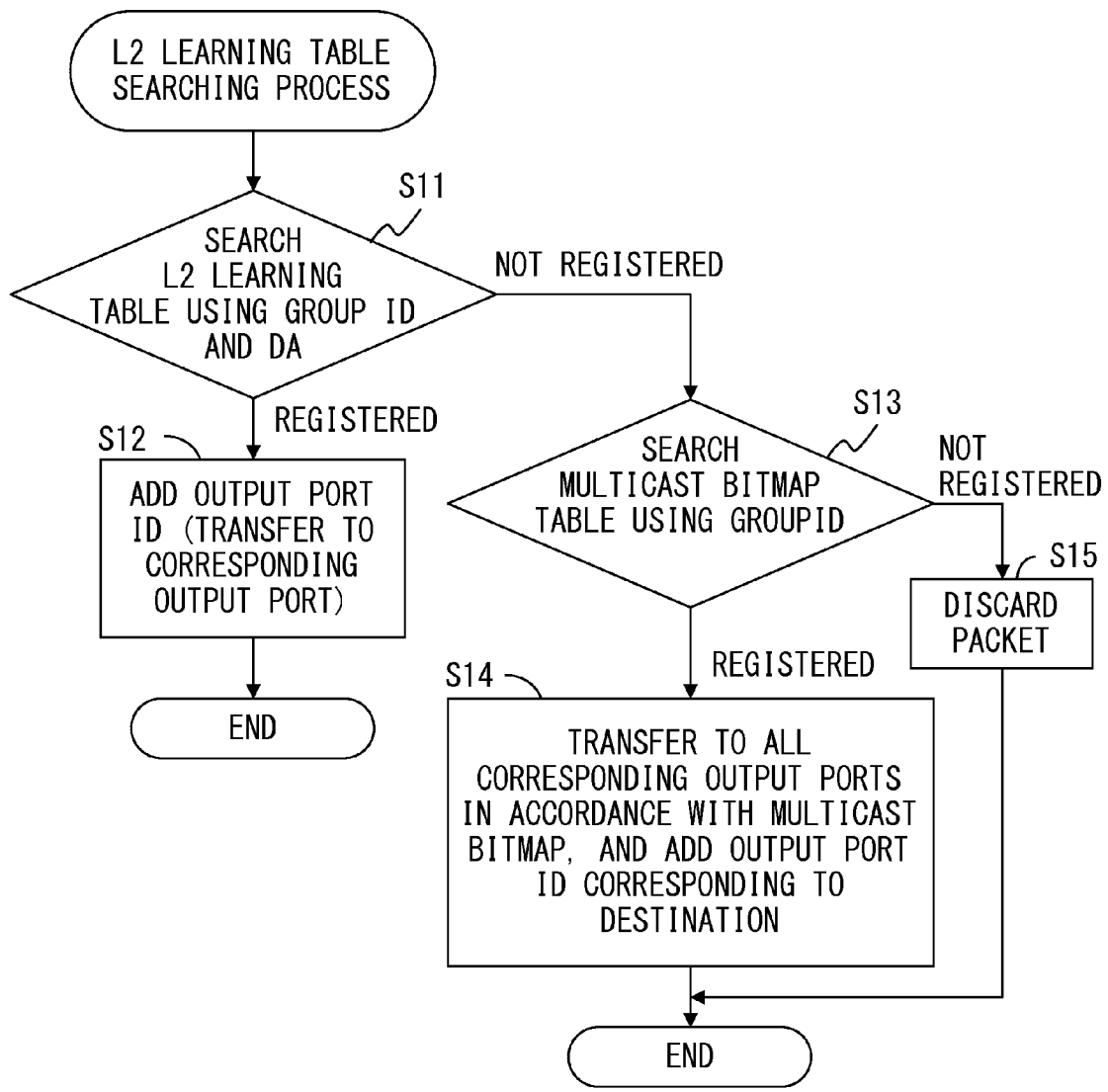
FIG. 8 illustrates a flowchart of an L2 learning table searching process.

FIG. 8 illustrates a flowchart explaining the L2 learning table searching process. The process based on this flowchart is executed, for example, by L2 learning table search functionality F3, which is realized by the processor 3a.

In step s11, L2 learning table search functionality F3 searches for the combination of the group ID and the destination address DA of an input packet in the L2 learning table 42. The group ID is has been retrieved based on the flowchart illustrated in FIG. 7. When the corresponding information is registered on the L2 learning table 42, the corresponding output port identifier is extracted from the L2 learning table 42 in step S12. The extracted output port identifier is added to the input packet. The input packet may be transferred to the port identified by the extracted output port identifier. Alternatively, the input packet may be transferred after rewriting of the VID as explained by referring to FIG. 5 and FIG. 6.

When the above combination is not registered on the L2 learning table 42 (not registered in step S11), L2 learning table search functionality F3 searches for the group ID in the multicast bitmap table 43 in step S13. When the corresponding information is registered on the multicast bitmap table 43, the input packet is transferred, in step S14, to each output port indicated by the extracted bitmap. When the group ID is not registered on the multicast bitmap table 43, the input packet is discarded in step S15.

Figure 9:
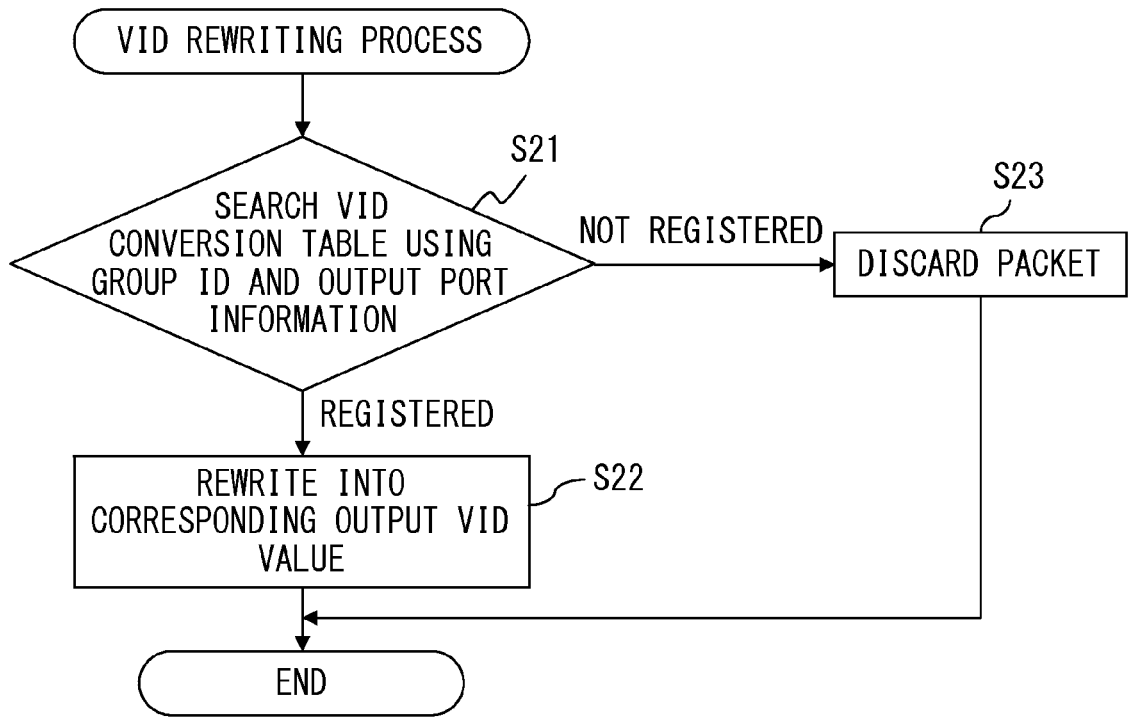
FIG. 9 illustrates a flowchart of a VID rewriting process.

FIG. 9 illustrates a flowchart explaining the VID rewriting process. The process based on this flowchart is executed, for example, by VID rewrite functionality F4, which is realized by the processor 3a.

In step S21, VID rewrite functionality F4 searches for the combination of the group ID and the output port identifier in the VID conversion table 44. When the corresponding information is registered on the VID conversion table 44, the virtual LAN identifier of the input packet is rewritten, in step S22, into the output virtual LAN identifier obtained in step S21. When the above combination is not registered on the VID conversion table 44, the input packet is discarded in step S23.

FIG. 10 illustrates an example of a configuration of increasing the number of virtual LANs by using general-purpose MAC switches. Lines #1 through #N are connected to the switching apparatus illustrated in FIG. 10. This switching apparatus includes general-purpose MAC switches 50A and 50B, interfaces 51-1 through 51-N, selectors (SELs) 52-1 through 52-N, VID convertors 53A-1 through 53A-N and 53B-1 through 53B-N, and multiplexers (MUXs) 54-1 through 54-N. This switching apparatus also includes the virtual LAN management table illustrated in FIG. 11. Each of the "general-purpose MAC switches" is provided with 4094 packet switches that correspond to a 12-bit virtual LAN identifier VID, and each of the packet switches determines output ports in accordance with destination MAC addresses.

The interfaces 51-1 through 51-N provide interfaces of the physical layer and the MAC layer to lines #1 through #N, respectively. Each of the selectors 52-1 through 52-N transfers input packets to the general-purpose MAC switch 50A or 50B in accordance with the virtual LAN identifiers assigned to the input packets. The VID convertors 53A-1 through 53A-N and 53B-1 through 53B-N refer to the virtual LAN management table in order to convert the virtual LAN identifiers of the input packets into internal virtual LAN identifiers. Also, the VID convertors 53A-1 through 53A-N and 53B-1 through 53B-N refer to the virtual LAN management table in order to convert, in reverse, the virtual LAN identifiers of packets output from the general-purpose MAC switches 50A and 50B. The multiplexers 54-1 through 54-N multiplex the packets output from the general-purpose MAC switches 50A and 50B.

Also, in the switching apparatus illustrated in FIG. 10, a new entry is generated on the virtual LAN management table illustrated in FIG. 11 when a virtual LAN is newly set up. In this example, each of the general-purpose MAC switches 50A and 50B is able to provide 4094 virtual LANs. Accordingly, the 1st through 4094th virtual LANs to be registered are assigned to the general-purpose MAC switch 50A, and the 4095th through 8188th virtual LANs to be registered are assigned to the general-purpose MAC switch 50B.

In the example illustrated in FIG. 10 and FIG. 11, terminal X connected to line #1 and terminal Y connected to line #2 belong to virtual LAN1 (the registration number is 1). Terminals X and Y may be user terminals, or may be virtual machines VM provided on the server. This virtual LAN is identified by virtual LAN identifier 100 on line #1, is identified by virtual LAN identifier 200 on line #2, and is identified by internal virtual LAN identifier 1 in the general-purpose MAC switch 50A.

It is assumed that a packet is transmitted from the terminal X to the terminal Y in the above configuration. In such a case, "VID=100" and "DA=Y" are assigned to this packet. Then this packet is transmitted through line #1 to be input to the switching apparatus.

The packet is terminated by the interface 51-1, and transferred to the selector 52-1. The selector 52-1 searches for "INPUT PORT=#1" and "VID=100" in the virtual LAN management table illustrated in FIG. 11. "SWITCH=50A" is obtained from this search. Thereafter, the selector 52-1 transfers the input packet to the general-purpose MAC switch 50A.

The VID convertor 53A-1 converts the virtual LAN identifier of the packet to be input to the general-purpose MAC switch 50A. In this example, the VID convertor 53A-1 searches for "INPUT PORT #1" and "VID=100" in the virtual LAN management table illustrated in FIG. 11. Thereby, "INTERNAL VID=1" is obtained. Accordingly, the VID convertor 53A-1 converts the virtual LAN identifier of the input packet from "100" into "1".

The general-purpose MAC switch 50A determines an output port in accordance with the destination address DA. In this example, it is assumed that "OUTPUT PORT #2" is obtained based on "DA=Y". Then, this packet is output from the general-purpose MAC switch 50A so that the packet is guided to line #2.

The VID convertor 53A-2 converts the virtual LAN identifier of the packet output from the general-purpose MAC switch 50A to be guided to line #2. In other words, the VID convertor 53A-2 searches for "OUTPUT PORT #2" and "INTERNAL VID=1" in the virtual LAN management table illustrated in FIG. 11. "OUTPUT VID=200" is obtained from this search. Accordingly, the VID convertor 53A-2 converts the virtual LAN identifier of the output packet from "1" into "200".

This output packet is output to line #2 via the multiplexer 54-2 and the interface 51-2. As a result, the above packet is transmitted to the terminal Y. Note that when a packet is transmitted from the terminal Y to the terminal X, VID conversion is performed in a manner reverse to the conversion performed when a packet is transmitted from the terminal X to the terminal Y.

As described above, the switching apparatus illustrated in FIG. 10 uses general-purpose MAC switches. Also in this configuration, a virtual LAN is identified by a combination of the line (i.e., the input/output port) that transmits a packet and a virtual LAN identifier. Accordingly, a greater number of virtual LANs can be provided by using a plurality of general-purpose MAC switches. Also, the configuration illustrated in FIG. 10 does not need to be provided with a layer 3 device such as a router or the like between the general-purpose MAC switches 50A and 50B. This makes the management or maintenance of the switching apparatus easy.

Figure 12:
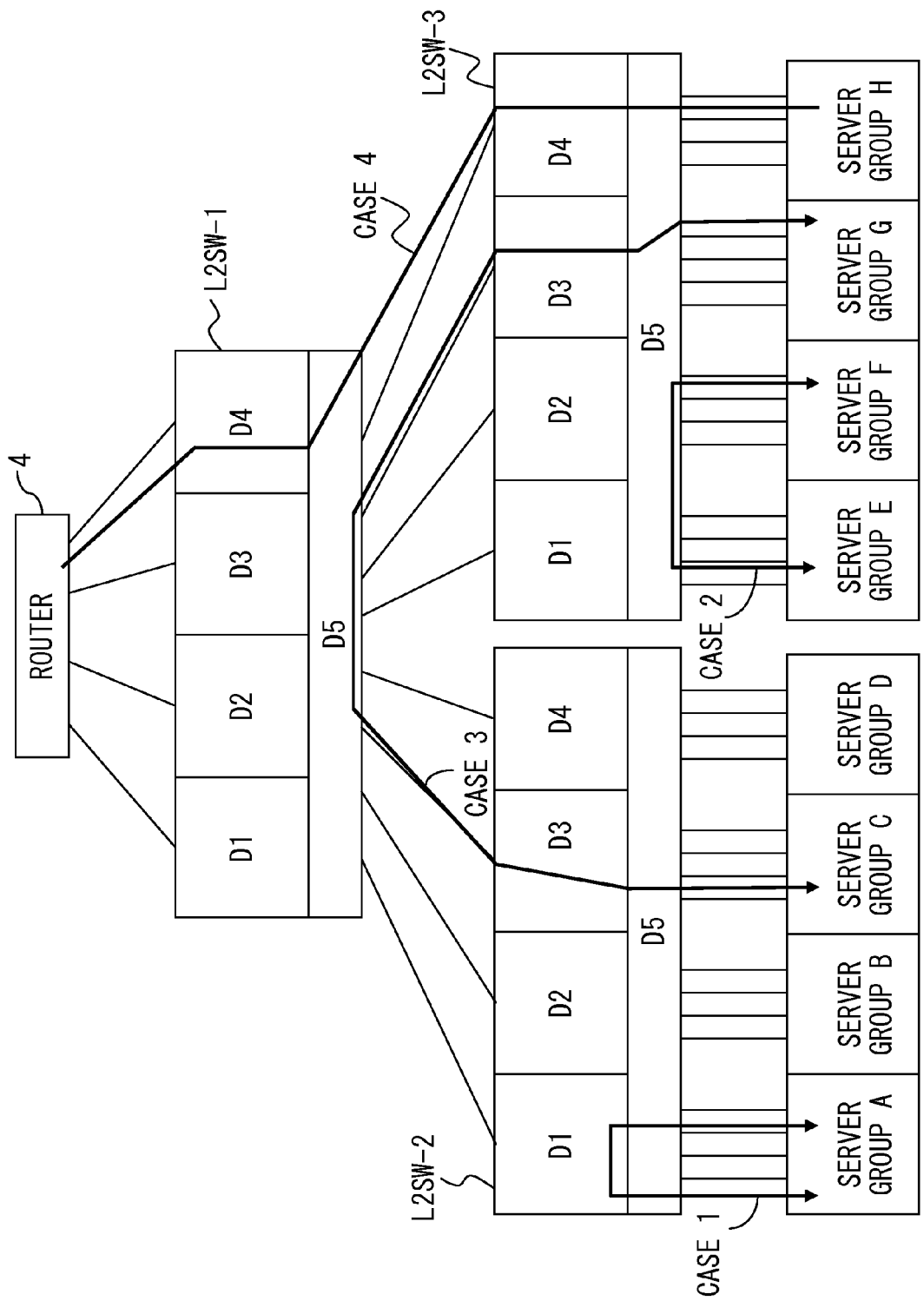
FIG. 12 illustrates an example of an L2 network using a plurality of switching apparatuses.

FIG. 12 illustrates an example of an L2 network using a plurality of switching apparatuses. In this example, three switching apparatuses are connected. Respective switching apparatuses L2SW-1 through L2SW-3 are realized by, for example, the switching apparatuses 3 explained by referring to FIGS. 2-9.

The switching apparatus L2SW-1 and the router 4 are connected by four lines. The switching apparatuses L2SW-1 and L2SW-2 are connected by four lines. The switching apparatuses L2SW-1 and L2SW-3 are connected by four lines. That is, twelve lines are connected to the switching apparatus L2SW-1. In other words, the switching apparatus L2SW-1 is provided with twelve ports.

The switching apparatus L2SW-2 and server group A are connected by four lines. The switching apparatus L2SW-2 is connected to server group B, server group C, and server group D by four lines for each connection. That is, twenty lines are connected to the switching apparatus L2SW-2. In other words, the switching apparatus L2SW-2 is provided with twenty ports.

Similarly, the switching apparatus L2SW-3 is connected to server group E, server group F, server group G, and server group F1 by four lines for each connection. That is, twenty lines are connected to the switching apparatus L2SW-3. In other words, the switching apparatus L2SW-3 is provided with twenty ports.

Each of the switching apparatuses L2SW-1 through L2SW-3 includes switch domains D1 through D5. In switch domains D1 through D4, virtual LANs are identified by combinations of connected lines and virtual LAN identifiers 1-3000. In switch domains D5, virtual LANs are identified by combinations of connected lines and virtual LAN identifiers 3001-4094.

<Case 1>
Communications within a server group are realized by using one of switch domains D1 through D4 in the switching apparatus L2SW-2 or L2SW-3. For example, communications between two virtual machines in server group A are realized by using switch domain D1 of the switching apparatus L2SW-2. In such a case, the virtual LAN is identified by a combination of a line between the switching apparatus L2SW-2 and server group A and a virtual LAN identifier selected from among virtual LAN identifiers 1-3000.

<Case 2>
Communications between different server groups are realized by using switch domains D5 of the switching apparatus L2SW-2 or L2SW-3. For example, communications between a virtual machine in server group E and a virtual machine in server group F are realized by using switch domain D5 of the switching apparatus L2SW-3. In such a case, the virtual LAN is identified by a combination of lines between the switching apparatus L2SW-3 and server groups E and F and a virtual LAN identifier selected from among virtual LAN identifiers 3001-4094.

<Case 3>
Communications between servers accommodated by different switching apparatuses are realized by using switch domain D5 of the switching apparatus L2SW-1, one of switch domains D1 through D4 of the switching apparatus L2SW-2, and one of switch domains D1 through D4 of the switching apparatus L2SW-3. In FIG. 12, a communication path between a virtual machine in server group C and a virtual machine in server group G is illustrated.

<Case 4>
Communications between the router 4 and an arbitrary server are realized by using one of switch domains D1 through D4 of the switching apparatus L2SW-1, and one of switch domains D1 through D4 of the switching apparatus L2SW-2 or L2SW-3. In FIG. 12, a communication path between the router 4 and a virtual machine in server group H is illustrated.

As described above, in the switching apparatus L2SW-2, each of switch domains D1 through D4 can use virtual LAN identifiers 1-3000. In other words, the same identifier among virtual LAN identifiers 1-3000 can be duplicately assigned to plural switch domains D1 through D4. Accordingly, the switching apparatus L2SW-2 can provide 12000 or more virtual LANs by using switch domains D1 through D4. Also, the switching apparatus L2SW-2 can provide 1094 or more virtual LANs by using switch domain D5. As a result, the switching apparatus L2SW-2 can provide about 13000 or more virtual LANs by using switch domains D1 through D5. Similarly, the switching apparatus L2SW-3 can also provide about 13000 or more virtual LANs. Therefore, about 26000 or more virtual LANs can be set up on the L2 network illustrated in FIG. 12.

Figure 13:
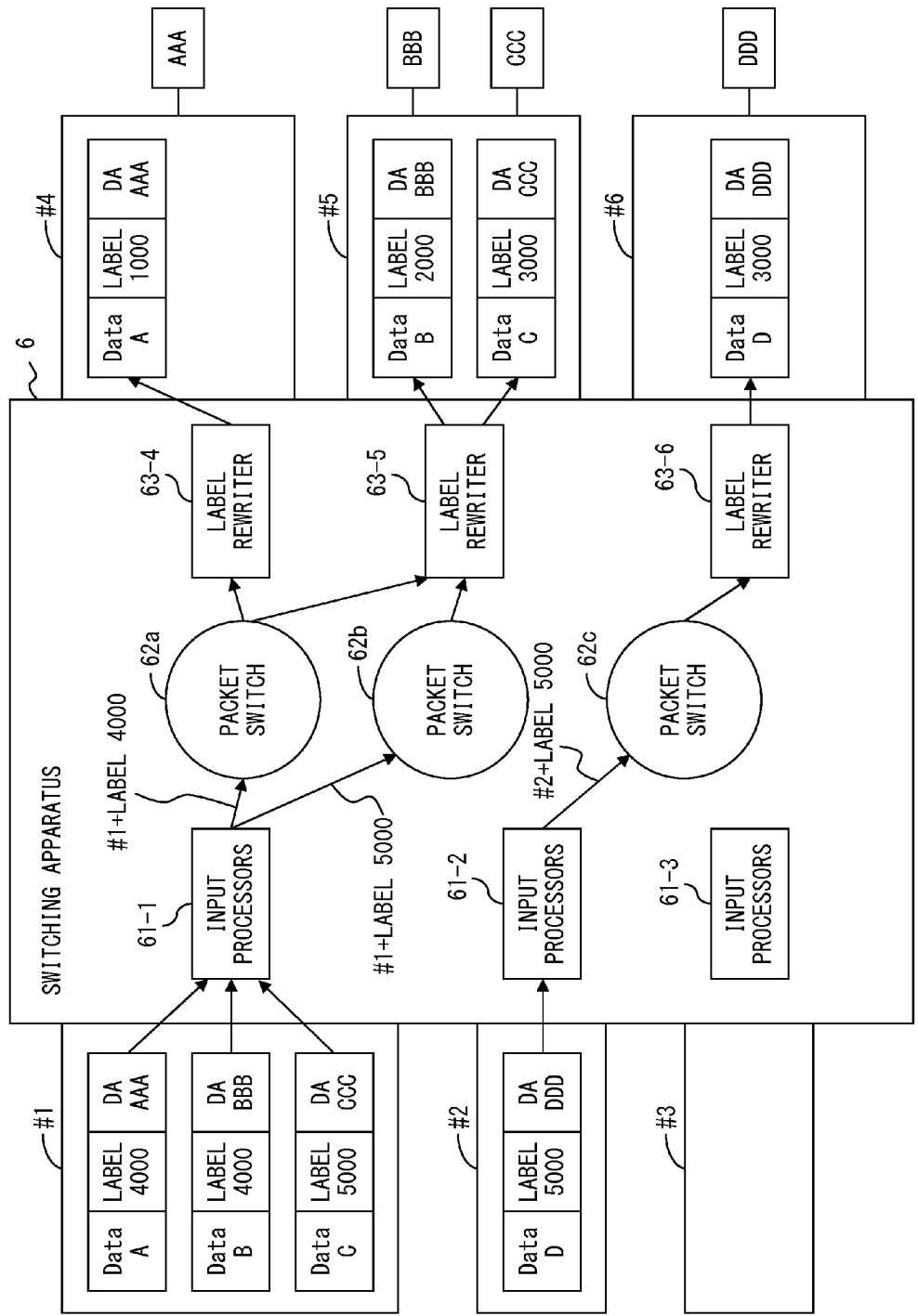
FIG. 13 illustrates operations of a switching apparatus according to another embodiment.

FIG. 13 illustrates operations of a switching apparatus according to another embodiment. A switching apparatus 6 illustrated in FIG. 6 has basically similar configuration and operation as the switching apparatus 3 explained by referring to FIGS. 4-9.

However, in the switching apparatus 3 illustrated in FIGS. 4-9, virtual LAN identifiers VID of IEEE802.1Q are used as information to identify virtual paths (or virtual LANs). In the switching apparatus 6 illustrated in FIG. 13, by contrast, label information of MPLS (Multi-Protocol Label Switching) is used as information to identify virtual paths.

MPLS is defined in RFC3032. On an MPLS network, packets are transferred according to MPLS headers. As illustrated in FIG. 14, an MPLS header includes a label of 20 bits. This label information is used as identifying information to represent a virtual path. The MPLS packet is generated, for example, by adding an MPLS header to the head of the Ethernet frame illustrated in FIG. 3.

In FIG. 13, an MPLS packet is input to the switching apparatus 6. Input processors 61-1 through 61-3, packet switches 62a through 62c, and label rewriters 63-4 through 63-6 in the switching apparatus 6 have similar operation as the input processors 31-1 through 31-3, the packet switches 32a through 32c, and the VID rewriters 33-4 through 33-6 illustrated in FIG. 4.

However, the input processors 61-1 through 61-3 respectively transfer input MPLS packets to corresponding packet switches 62a through 62c according to the label information. The packet switch 62a through 62c respectively transfer the input MPLS packets to output ports (ports #4 through #6 in this example) corresponding to the destination addresses. The label rewriters 63-4 through 63-6 respectively rewrite the label information of the packets to be output.

Figure 15:
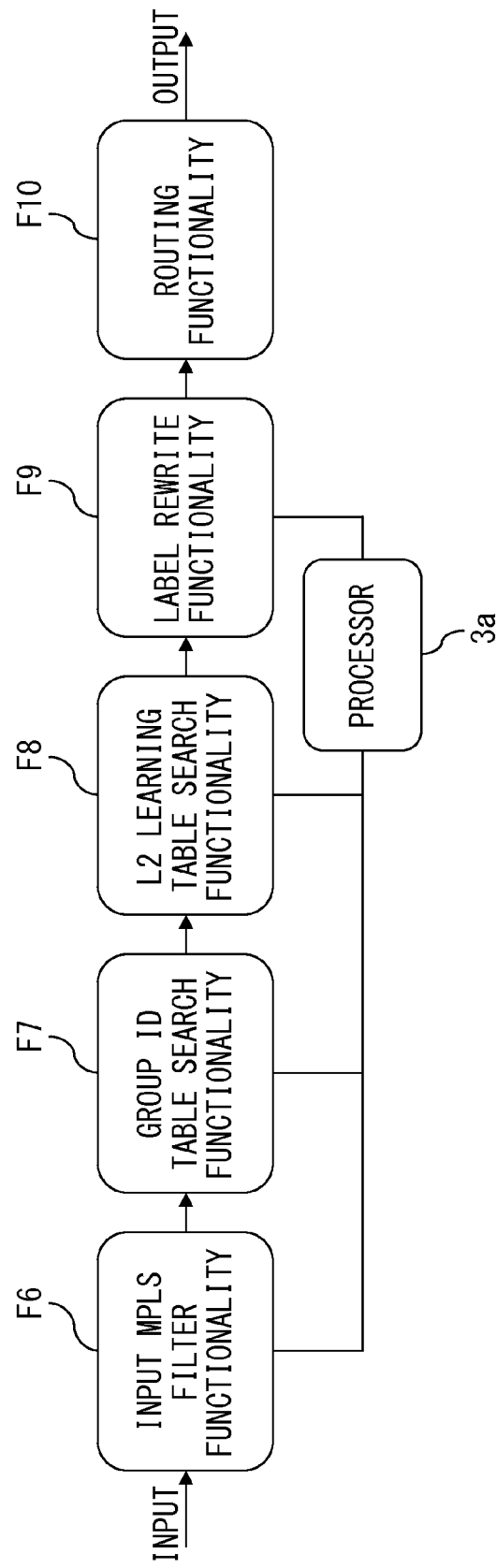
FIG. 15 illustrates a functional block diagram of a switching apparatus provided on an MPLS network.

FIG. 15 illustrates a functional block diagram of a switching apparatus provided on an MPLS network. Input MPLS filter functionality F6, group ID table search functionality F7, L2 learning table search functionality F8, label rewrite functionality F9, and routing functionality F10 included in the switching apparatus 6 provided on an MPLS network are similar to input filter functionality F1, group ID table search functionality F2, L2 learning table search functionality F3, VID rewrite functionality F4, and routing functionality F5 included in the switching apparatus 3.

However, input MPLS filter functionality F6 not only performs filtering on an input MPLS packet, but also detects the input port identifier that identifies the port that received the input MPLS packet, the label information assigned to the input MPLS packet, and the destination address of the input MPLS packet. Group ID table search functionality F7 searches for the input port identifier and the label information of the input MPLS packet in the group ID table. The group ID table stores group IDs with respect to combinations of input port identifier and the label information.

L2 learning table search functionality F8 searches for the group ID and the destination address of the input MPLS packet in the L2 learning table. The L2 learning table stores output port identifiers with respect to combinations of group IDs and destination addresses. Label rewrite functionality F9 searches for the group ID and the output port identifier of the input MPLS packet in the label conversion table. The label conversion table stores output label information with respect to combinations of group IDs and output port identifiers. Routing functionality F10 transfers the MPLS packet to the port specified by the output port identifier retrieved by L2 learning table search functionality F8. The label of this MPLS packet has been rewritten by label rewrite functionality F9.

The switching apparatus 3 illustrated in FIGS. 4-9 can provide virtual LANs by using a virtual LAN identifier VID for each line (or each port) in a network in which virtual paths are identified by using virtual LAN identifiers VID of IEEE802.1Q. The switching apparatus 6 illustrated in FIGS. 13 and 15 can provide virtual LANs by using label information for each line (or each port) in a network in which virtual paths are identified by using label information of MPLS. Further, the switching apparatuses according to the invention can provide a virtual LAN not only by using the above virtual LAN identifier VID or MPLS label, but can also provide a virtual LAN by using virtual path information for each line (or each port). For example, the switching apparatuses according to the invention may be applied to a PBB (Provider Backbone Bridging) network.

As described above, a greater number of virtual LANs can be set up for each line (or each port) when a packet in a format in which a greater number of bits are used to represent a virtual path is used. In such a case, in a network that has introduced a switching apparatus according to an embodiment, packets in variety of formats can be transferred with similar configuration as MAC-based switch. Accordingly, network administrators can set up virtual LANs without understanding various formats (such as MPLS, PBB, Q-IN-Q, ATM, etc.)

Also, when a switching apparatus according to an embodiment is introduced, a plurality of packet formats may be used at the same time. For example, it is possible to set up an MPLS network in a region where traffic is congested while setting up a virtual LAN based on IEEE802.1Q in other regions. In such a case, more than 4094 virtual LANs may be set up for each line in a region where traffic is congested.

Next, explanations will be given for a method for setting up a virtual LAN by using a switching apparatus according to the embodiment. Steps of setting up a virtual LAN on the network illustrated in FIG. 16 will be explained below.

The network illustrated in FIG. 16 is provided with three switching apparatuses L2SW-1 through L2SW-3. Each of the switching apparatuses L2SW-1 through L2SW-3 is, for example, the switching apparatus 3 illustrated in FIGS. 4-9.

Port #1 of the switching apparatus L2SW-1 is connected to port #1 of the switching apparatus L2SW-2. Port #2 of the switching apparatus L2SW-1 is connected to port #1 of the switching apparatus L2SW-3. Ports #2 and #3 of the switching apparatus L2SW-2 are connected to server systems A and B, respectively. Ports #2 and #3 of the switching apparatus L2SW-3 are connected to server systems C and D, respectively.

A monitor/control device 71 sets up a virtual LAN in response to an instruction from a user. Also, the monitor/control device 71 is provided with a computer, an input/output device, and a communications device. The input/output device includes, for example, a keyboard, a mouse, a display device, or the like. A user can give an instruction to set up a virtual LAN by using this input/output device. The communications device transmits and receives information to and from the respective switching apparatuses L2SW-1 through L2SW-3 and server systems A through D.

Each of the switching apparatuses L2SW-1 through L2SW-3 has a network topology management table 72. The network topology management tables 72 manage information representing network topologies. In other words, each of the network topology management tables 72 manages information representing connection relationships based on physical lines that connect the devices (the switching apparatuses L2SW-1 through L2SW-3 and the server systems A through D).

FIG. 17 illustrates an example of the network topology management table 72. The network topology management table 72 illustrated in FIG. 17 represents the topology of the network illustrated in FIG. 16. By topology information managed by the network topology management table 72, physical routes on the network are identified uniquely.

Figure 18A:
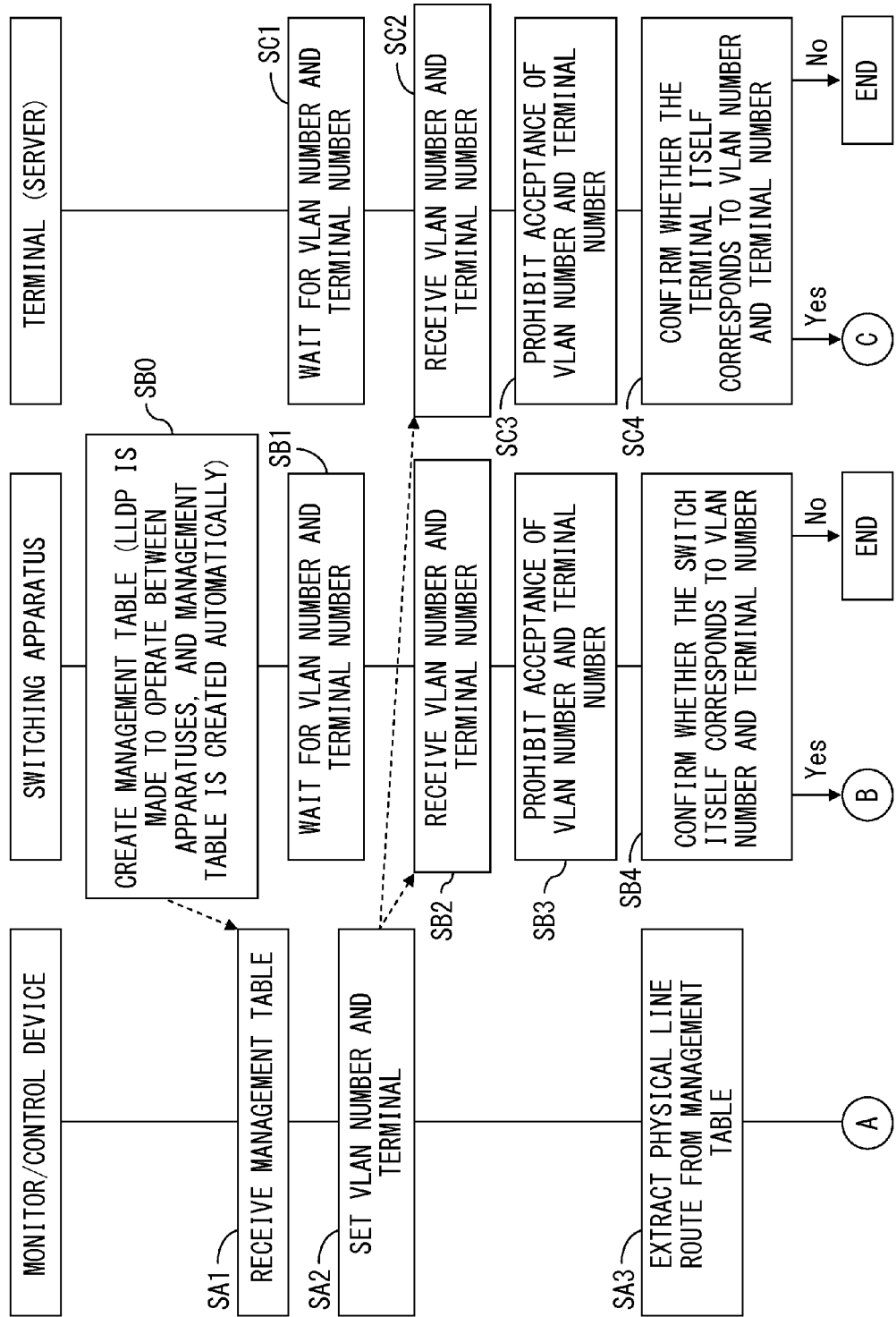
FIGS. 18A and 18B illustrate a sequence diagram explaining steps of setting up a virtual LAN.
Figure 18B:
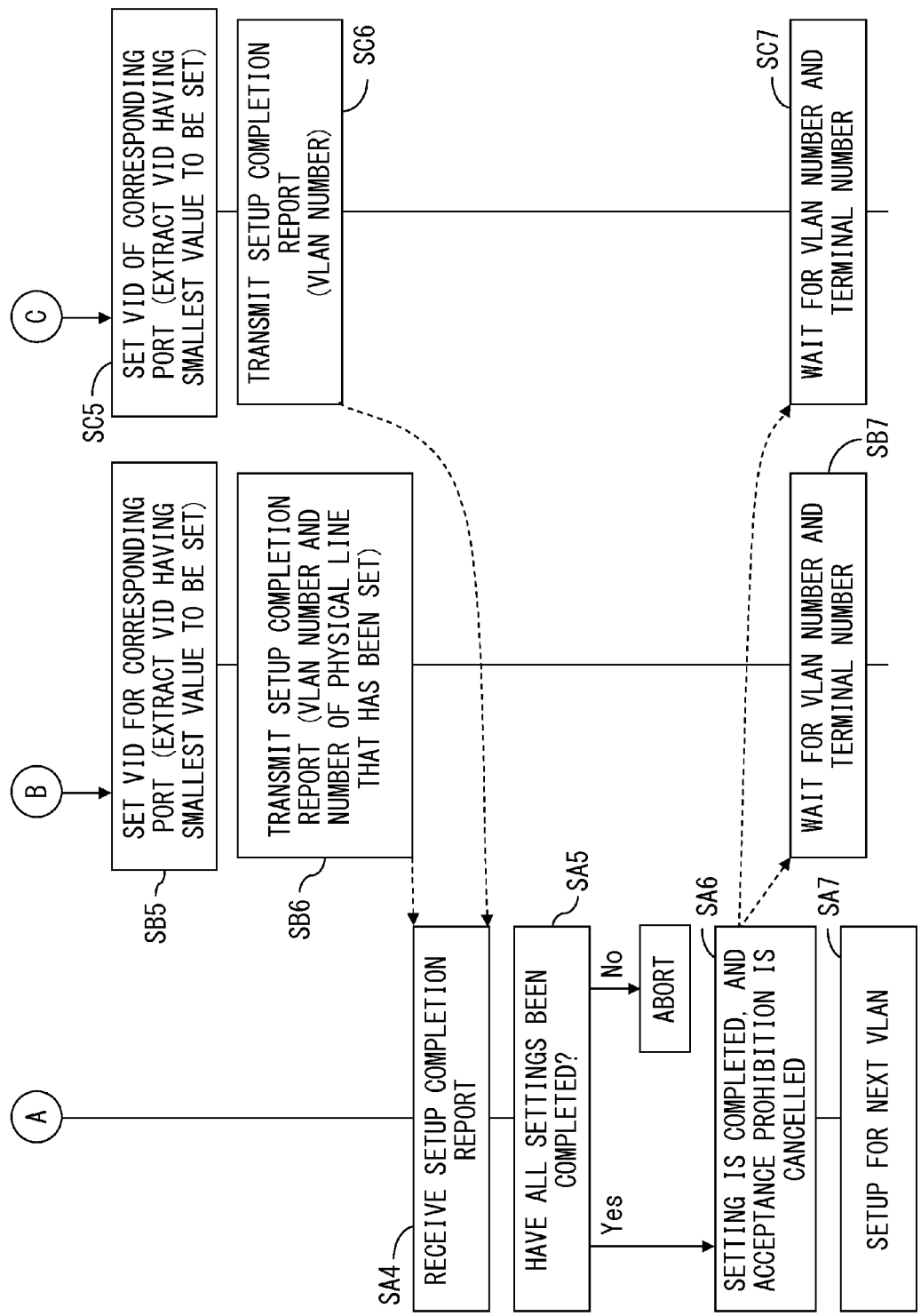

Steps of setting up a virtual LAN on the network of the above configuration will be explained by referring to the sequence diagram illustrated in FIGS. 18A and 18B. The L2SW in FIGS. 18A and 18B corresponds to the respective switching apparatuses L2SW-1 through L2SW-3 illustrated in FIG. 16. Also, the terminal illustrated in FIGS. 18A and 18B represents each of the server systems A through D (or virtual machines VM generated in the server systems) illustrated in FIG. 16.

In step SB0, each L2SW creates the network topology management table 72. The network topology management table 72 is created automatically based on the LLDP (Link Layer Discovery Protocol) although the scope of the invention is not limited to this. The LLDP is a neighbor discovery protocol defined by IEEE802.1AB, under which a neighboring node is recognized by transmitting and receiving an LLDP frame between nodes (i.e., between L2SWs). However, this method is used when each L2SW supports the LLDP. The network topology management tables 72 may also be created manually by a network administrator.

An arbitrary one of the L2SW-1 through L2SW-3 transmits the created network topology management table 72 to the monitor/control device 71. Communications between the L2SWs and the monitor/control device 71 are implemented based on, for example, a SNMP/TL-1 response format of SNMP, FTP, or the like. Thereafter, in step SB1, each L2SW waits for a virtual LAN number and a terminal number to be transmitted from the monitor/control device 71. Also, in step SC1, each terminal waits for a virtual LAN number and a terminal number to be transmitted from the monitor/control device 71.

The monitor/control device 71 receives the network topology management table 72 from the L2SW in step SA1. Next, in step SA2, the monitor/control device 71 receives from a user an instruction to set up a new virtual LAN. In this example, it is assumed that the user inputs an instruction to set up a virtual LAN that connects server systems A, C, and D. Then, the monitor/control device 71 generates virtual LAN specifying information in accordance with the above instruction, and registers that information on the virtual LAN management table. Virtual LAN specifying information represents, for a virtual LAN number that identifies a virtual LAN, a terminal number that identifies two or more terminals belonging to that virtual LAN. A unique value in the network illustrated in FIG. 16 is assigned as a virtual LAN number.

FIG. 19 illustrates an example of a virtual LAN management table. On the virtual LAN management table, a virtual LAN number and connection section information are registered in each entry. Connection section information represents a group of terminals connected to the virtual LAN. In this example, "VIRTUAL LAN NUMBER: 100" and "CONNECTION SECTION: SERVER SYSTEM A_VM1, SERVER SYSTEM C_VM1, SERVER SYSTEM D_VM1" are registered for registration number 1. This virtual LAN specifying information represents the virtual LAN illustrated in FIG. 16. Also, "VIRTUAL LAN NUMBER: 200" and "CONNECTION SECTION: SERVER SYSTEM A_VM2, SERVER SYSTEM B_VM2" are registered for registration number 2.

The monitor/control device 71 refers to the network topology management tables 72 in order to extract a physical line route that realizes the virtual LAN that has been newly registered on the virtual LAN management table in step SA3. In this example, the physical line routes as below are obtained for virtual LAN number 100 described above.
Server system A: (1(1))-((1)2(2))-A
Server system C: (1(2))-((1)3(2))-C
Server system D: (3(3))-D In the above expression, for example, (1(1)) represents port #1 of the L2SW-1. Also, ((1)2(2)) represents port #1 and port #2 of the L2SW-2. (1(1))-((1)2(2))-A represents that the physical line between port #1 of the L2SW-1 and port #1 of the L2SW-2 and the physical line between port #2 of the L2SW-2 and server system A are used. Accordingly, five physical lines #1 through #5 below are extracted for the virtual LAN number 100.
Line #1: physical line between port #1 of the L2SW-1 and port #1 of the L2SW-2
Line #2: physical line between port #2 of the L2SW-2 and server system A
Line #3: physical line between port #2 of the L2SW-1 and port #1 of the L2SW-3
Line #4: physical line between port #2 of the L2SW-3 and server system C
Line #5: physical line between port #3 of the L2SW-3 and server system D Each L2SW receives virtual LAN specifying information including the virtual LAN number and the terminal number from the monitor/control device 71 in step SB2. Then, in step SB3, each L2SW prohibits acceptance of new virtual LAN numbers and terminal numbers during a period before the setting of the virtual LAN identifier VID is terminated.

In step SB4, each L2SW confirms whether or not a virtual LAN identifier has to be set for the virtual LAN number and the terminal number received from the monitor/control device 71. At this time, each L2SW refers to the network topology management table 72 in order to confirm whether or not a virtual LAN identifier has to be set. For example, the L2SW-1 determines that virtual LAN identifiers VID have to be set respectively for lines #1 and #2 for virtual LAN number 100.

In step SB5, each L2SW sets a virtual LAN identifier for ports used for setting up a virtual LAN. When this process is performed, L2SW extracts the virtual LAN identifier having the smallest value among those that have not been used, from among virtual LAN identifiers assigned for each line. In this example, setting is performed as below in order to set up the virtual LAN number 100.
L2SW-1
port #1(line #1): VID 2
port #2(line #3): VID 5
L2SW-2
port #1(line #1): VID 2
port #2(line #2): VID 1
L2SW-3
port #1(line #3): VID 5
port #2(line #4): VID 2
port #3(line #5): VID 1

As described above, each L2SW sets a virtual LAN identifier in accordance with the rule "virtual LAN identifier having the smallest value among those that have not been used are extracted, from among virtual LAN identifiers assigned for each line". Accordingly, in a pair of the L2SWs connected to the ends of each line, an identical virtual LAN identifier is assigned to a virtual path on that line. For example, in the L2SW-1 and the L2SW-2, "VID 2" is assigned to a virtual path on line #1. As a result, virtual LAN identifiers VID 2, VID 1, VID 5, VID 2, and VID 1 are set for physical lines #1 through #5, respectively.

Thereafter, each L2SW transmits a setup completion report to the monitor/control device 71. The setup completion report includes a virtual LAN number and the number of a physical line to which a virtual LAN identifier has been assigned. For example, the switching apparatus L2SW-1 uses a setup completion report in order to report "VIRTUAL LAN NUMBER 100" and "LINES #1 AND #3" to the monitor/control device 71.

Steps SC2 through SC6 executed by the respective terminals (server systems A, C, and D in FIG. 16) are similar to steps SB2 through SB6 executed by the L2SWs. However, in step SC6, each terminal uses a setup completion report in order to report the virtual LAN number to the monitor/control device 71.

In step SA4, the monitor/control device 71 receives setup completion reports from the respective L2SWs and terminals. In step SA5, the monitor/control device 71 confirms whether or not setting of a virtual LAN has been completed in each L2SW and each terminal. When this confirmation is performed, the monitor/control device 71 confirms whether or not virtual LAN identifiers VID have been completely set respectively for the lines extracted in step SA3 (lines #1 through #5 in this example).

When virtual LAN identifiers VID have been completely set for all lines, the monitor/control device 71 transmits a setup completion confirmation report to the respective L2SWs and terminals in step SA6. This setup completion confirmation report includes a message instructing the cancellation of the acceptance prohibition. Thereafter, in step SA7, the monitor/control device 71 enters an operation mode of accepting the setup of a next virtual LAN.

Upon receiving the above setup completion confirmation report, each L2SW enters an operation mode of accepting a next virtual LAN number and a terminal number in step SB7. Similarly, each terminal enters, in step SC7, an operation mode of accepting a next virtual LAN number and a terminal number when it has received the above setup completion confirmation report.

In steps illustrated in FIGS. 18A and 18B, virtual LAN numbers reported from the monitor/control device 71 to the respective L2SWs are used as, for example, group IDs in the example illustrated in FIGS. 5 and 6. Also, the group ID table 41, the L2 learning table 42, and the VID conversion table 44 illustrated in FIG. 6 are created by setting correspondence relationships between ports and virtual LAN identifiers VID in step SB5 illustrated in FIGS. 18A and 18B.

As an example, a virtual path to transmit a packet from server system A to server system C in the virtual LAN illustrated in FIG. 16 is described. In this example, the destination address of that virtual path is assumed to be CCC. In such a case, information below is registered on the group ID table 41, the L2 learning table 42, and the VID conversion table 44 in the L2SW-1.
Group ID Table 41:
"INPUT PORT: #1" "INPUT VID: 2" "GROUP ID: 100"
L2 Learning Table 42:
"GROUP ID: 100" "DESTINATION ADDRESS: CCC" "OUTPUT PORT: #2"
VID Conversion Table 44:
"GROUP ID: 100" "OUTPUT PORT: #2" "OUTPUT VID: 5"

The information below is registered on the group ID table 41, the L2 learning table 42, and the VID conversion table 44 in the L2SW-2.
Group ID Table 41:
"INPUT PORT: #2" "INPUT VID: 1" "GROUP ID: 100"
L2 Learning Table 42:
"GROUP ID: 100" "DESTINATION ADDRESS: CCC" "OUTPUT PORT: #1"
VID Conversion Table 44:
"GROUP ID: 100" "OUTPUT PORT: #1" "OUTPUT VID: 2"

The information below is registered on the group ID table 41, the L2 learning table 42, and the VID conversion table 44 in the L2SW-3.
Group ID Table 41:
"INPUT PORT: #1" "INPUT VID: 5" "GROUP ID: 100"
L2 Learning Table 42:
"GROUP ID: 100" "DESTINATION ADDRESS: CCC" "OUTPUT PORT: #2"
VID Conversion Table 44:
"GROUP ID: 100" "OUTPUT PORT: #2" "OUTPUT VID: 2"

Information about other virtual paths is further registered in each of the L2SW-1 through L2SW-3 as necessary. Thereby, the virtual LAN illustrated in FIG. 16 is set up.

Thereafter, data transmission, for example, from virtual machine VM1 of server system A to virtual machine VM1 of server system C is performed as below.

(1) Server system A transmits a packet through line #2. The destination address DA of this packet specifies virtual machine VM1 in server system C. In addition, VID 1 is assigned to this packet as a virtual LAN identifier.

(2) The packet output from server system A is transmitted through line #2, and is input to port #2 of the L2SW-2. The L2SW-2 detects "VIRTUAL LAN=100" based on "VID=1" and "PORT #2", and determines an output port by using the packet switch that corresponds to the detected virtual LAN. In this example, "OUTPUT PORT #1" is determined based on the destination address DA. Then, the L2SW-2 rewrites the virtual LAN identifier from "VID 1" to "VID 2" by referring to the VID conversion table 44 within the L2SW-2, and then outputs the packet to line #1 through port #1.

(3) The packet output from the L2SW-2 is transmitted through line #1, and is input to port #1 of the L2SW-1. The L2SW-1 detects "VIRTUAL LAN=100" based on "VID=2" and "PORT #1", and determines an output port by using the packet switch that corresponds to the detected virtual LAN. In this example, "OUTPUT PORT #2" is determined. Then, the L2SW-1 rewrites the virtual LAN identifier from "VID 2" to "VID 5" by referring to the VID conversion table 44 within the L2SW-1, and then outputs the packet to line #3 through port #2.

(4) The packet output from the L2SW-1 is transmitted through line #3, and is input to port #1 of the L2SW-3. The L2SW-3 detects "VIRTUAL LAN=100" based on "VID=5" and "PORT #1", and determines an output port by using the packet switch that corresponds to the detected virtual LAN. In this example, "OUTPUT PORT #2" is determined. Then, the L2SW-3 rewrites the virtual LAN identifier from "VID 5" to "VID 2" by referring to the VID conversion table 44 within the L2SW-3, and then outputs the packet to line #4 through port #2.

(5) The packet output from the L2SW-3 is transmitted through line #4, and is input to server system C. Server system C detects "VIRTUAL LAN=100" based on "VID=2", and passes the received packet to the virtual machine that corresponds to the detected virtual LAN.

As described above, according to a method for setting up a virtual LAN of the embodiment, when a virtual LAN number and terminals belonging to the virtual LAN are reported from the monitor/control device 71 to each switching apparatus, each switching apparatus creates the group ID table 41, the L2 learning table 42, and the VID conversion table 44. In other words, operations of setting up virtual LAN paths for a switching apparatus according to the embodiment are equal to or easier than in a case of a conventional virtual LAN.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. A switching apparatus having a plurality of ports, comprising:
    switch information storage to store output port identifiers, which have different directions, and output virtual path identifiers for a combination of an input port identifier, a destination address and an input virtual identifier identifying a virtual LAN, the switch information storage including
        a first storage to store a group identifier for a combination of an input port identifier and an input virtual path identifier;
        a second storage to store an output port identifier for a combination of a group identifier and a destination address; and
        a third storage to store an output virtual path identifier for a combination of a group identifier and an output port identifier;
    a detector to detect a first input virtual path identifier and a first destination address assigned to an input packet;
    a searcher to search the switch information storage for a first output port identifier and a first output virtual path identifier based on a first input port identifier that identifies a port to which the input packet has been input, the first input virtual path identifier, and the first destination address;

a packet switch to transfer the input packet to a port identified by the first output port identifier; and a rewriter to rewrite the input virtual path identifier assigned to the input packet into the output virtual path identifier.

2. A switching apparatus having a plurality of ports, comprising:

switch information storage to store output port identifiers, which have different directions, and output virtual path identifiers for a combination of an input port identifier, a destination address and an input virtual identifier providing label information in an MPLS header, the switch information storage including;

a first storage to store a group identifier for a combination of an input port identifier and an input virtual path identifier;

a second storage to store an output port identifier for a combination of a group identifier and a destination address; and a third storage to store an output virtual path identifier for a combination of a group identifier and an output port identifier;

a detector to detect a first input virtual path identifier and a first destination address assigned to an input packet;

a searcher to search the switch information storage for a first output port identifier and a first output virtual path identifier based on a first input port identifier that identifies a port to which the input packet has been input, the first input virtual path identifier, and the first destination address;

a packet switch to transfer the input packet to a port identified by the first output port identifier; and a rewriter to rewrite the input virtual path identifier assigned to the input packet into the output virtual path identifier.

3. The switching apparatus according to claim 2, wherein the switch information storage includes:

a first storage to store a group identifier for a combination of an input port identifier and an input virtual path identifier; and a second storage to store the output port identifiers for a combination of a group identifier and a destination address.

4. A switching apparatus, comprising:

a plurality of ports;

a memory to store output port identifiers, which have different directions, and output virtual path identifiers for a combination of an input port identifier, an input virtual path identifier providing label information in an MPLS header, and a destination address, the memory including a first storage to store a group identifier for a combination of an input port identifier and an input virtual path identifier;

a second storage to store an output port identifier for a combination of a group identifier and a destination address; and a third storage to store an output virtual path identifier for a combination of a group identifier and an output port identifier;

a processor that detects a first input virtual path identifier and a first destination address assigned to an input packet;

obtains a first output port identifier and a first output virtual path identifier from the memory based on a first input port identifier that identifies a port to which the input packet has been input, the first input virtual path identifier, and the first destination address, transfers the input packet to a port identified by the first output port identifier, and rewrites the input virtual path identifier assigned to the input packet into the output virtual path identifier.

5. A switching apparatus, comprising:

a plurality of ports;

a memory to store output ports identifiers, which have different directions, and output virtual path identifiers for a combination of an input port identifier, an input virtual path identifier identifying a virtual LAN, and a destination address, the memory including a first storage to store a group identifier for a combination of an input port identifier and an input virtual path identifier;

a second storage to store an output port identifier for a combination of a group identifier and a destination address; and a third storage to store an output virtual path identifier for a combination of a group identifier and an output port identifier;

a processor that detects a first input virtual path identifier and a first destination address assigned to an input packet, obtains a first output port identifier and a first output virtual path identifier from the memory based on a first input port identifier that identifies a port to which the input packet has been input, the first input virtual path identifier, and the first destination address, and transfers the input packet to a port identified by the first output port identifier, and rewrites the input virtual path identifier assigned to the input packet into the output virtual path identifier.

* * * * *